(12) United States Patent
Colonna et al.

(10) Patent No.: US 11,884,428 B2
(45) Date of Patent: Jan. 30, 2024

(54) TRANSFER STATION FOR API SEED CRYSTALS

(71) Applicants: Lonza Ltd., Visp (CH); Lugaia AG, Raron (CH)

(72) Inventors: Luca Colonna, Visp (CH); Leander Stoffel, Visp (CH); Thomas Buchner, Visp (CH); Viktor Schnyder, Raron (CH)

(73) Assignee: Lonza Ltd., Visp (CH)

( * ) Notice: Subject to any disclaimer, the term of this patent is extended or adjusted under 35 U.S.C. 154(b) by 453 days.

(21) Appl. No.: 17/266,228

(22) PCT Filed: Aug. 7, 2019

(86) PCT No.: PCT/IB2019/056733
§ 371 (c)(1),
(2) Date: Feb. 5, 2021

(87) PCT Pub. No.: WO2020/031115
PCT Pub. Date: Feb. 13, 2020

(65) Prior Publication Data
US 2021/0290487 A1 Sep. 23, 2021

Related U.S. Application Data

(60) Provisional application No. 62/716,412, filed on Aug. 9, 2018.

(51) Int. Cl.
*B65B 1/28* (2006.01)
*B65B 9/12* (2006.01)
(Continued)

(52) U.S. Cl.
CPC .................. *B65B 1/28* (2013.01); *B65B 1/06* (2013.01); *B65B 9/12* (2013.01); *B65B 37/02* (2013.01);
(Continued)

(58) Field of Classification Search
CPC .... B65B 1/06; B65B 1/28; B65B 9/12; B65B 37/02; B65B 39/001; B65B 69/0075; B65B 69/0083; B65B 69/0091; B65G 69/181
(Continued)

(56) References Cited

U.S. PATENT DOCUMENTS 4,991,633 A 2/1991 Wong
6,653,377 B1 11/2003 Lloyd et al.
(Continued)

FOREIGN PATENT DOCUMENTS

DE 3539619 4/1987
DE 102011056205 6/2013
(Continued)

OTHER PUBLICATIONS

PCT/IB2019/056733 International Search Report and Written Opinion, dated Nov. 22, 2019.

*Primary Examiner* — Stephen F. Gerrity
(74) *Attorney, Agent, or Firm* — Dority & Manning, P.A.

(57) ABSTRACT

The present disclosure is directed to a big-bag transfer station for API seed crystals. The transfer station may permit the filling of smaller containers, such as bags or pouches, from a large container, such as a big bag. The transfer station may permit the transfer without contaminating the atmosphere of the room in which the station is housed. Additionally, the transfer station may limit cross-contamination between filling cycles by employing single-use liners.

12 Claims, 30 Drawing Sheets

(51) Int. Cl.
*B65B 1/06* (2006.01)
*B65B 39/00* (2006.01)
*B65B 37/02* (2006.01)
*B65G 69/18* (2006.01)

(52) U.S. Cl.
CPC .......... *B65B 39/001* (2013.01); *B65G 69/181* (2013.01)

(58) Field of Classification Search
USPC .......... 141/10, 114, 313, 314, 317; 414/404, 414/414
See application file for complete search history.

(56) References Cited

U.S. PATENT DOCUMENTS

| | | | |
|---|---|---|---|
| 2005/0263209 A1* | 12/2005 | Dietrich et al. .......... | B65B 1/16 141/114 |
| 2007/0251599 A1* | 11/2007 | Denk et al. ......... | B65B 69/0083 141/114 |
| 2008/0145198 A1 | 6/2008 | Multer et al. | |
| 2010/0127194 A1* | 5/2010 | Landry ............... | B65B 69/0075 251/7 |
| 2010/0132215 A1 | 6/2010 | Denk | |
| 2019/0135472 A1 | 5/2019 | Rubitschung | |

FOREIGN PATENT DOCUMENTS

| | | | | |
|---|---|---|---|---|
| FR | 2908387 A1 * | 5/2008 | ............... | B65B 1/28 |
| GB | 2029378 | 3/1980 | | |
| WO | WO-2009144021 A1 * | 12/2009 | ............... | B65B 1/28 |
| WO | WO 2010134102 | 11/2010 | | |

* cited by examiner

TRANSFER STATION FOR API SEED CRYSTALS

CROSS REFERENCE TO RELATED APPLICATIONS

This application is the U.S. National Stage entry of International Application Number PCT/IB2019/056733 filed under the Patent Cooperation Treaty and having a filing date of Aug. 7, 2019, which claims priority to U.S. Provisional Application No. 62/716,412 having a filing date of Aug. 9, 2018, all of which are hereby incorporated by reference herein in their entirety for all purposes.

BACKGROUND

An active pharmaceutical ingredient (API) is often stored in a powder form, such as a crystalline powder. The storage, transfer, and dispensing of APIs often require numerous protectionary precautions, largely for the sake of operator health and safety, as well as for maintaining product purity.

For example, when APIs are stored in big bags, smaller amounts are often dispensed into containers or process chutes in clean room environments. Operating personnel must don comprehensive personal protection equipment (PPE) when executing the dispensing. The clean room itself must be thoroughly decontaminated and cleaned after each product changeover to avoid cross-contamination of APIs.

In view of the above, a need exists for a transfer station for API seed crystals with increased flexibility, ease of use, and reduced dependence on clean room protocols and PPE.

SUMMARY

In general, the present disclosure is directed to a system and method for the handling and/or transfer of a biological or pharmaceutical product. For example, in one application, the system of the present disclosure is for transferring a biological or pharmaceutical product from a larger dispensing container to a smaller receiving container. The system and method of the present disclosure are particularly well suited to transferring active pharmaceutical ingredients (API) from one location to another without contaminating the outside atmosphere or environment. For instance, the system of the present disclosure can be designed so as to be completely closed during the transfer of the product. The system and method of the present disclosure can prevent product contamination and can prevent the biological or pharmaceutical product from escaping into the air while, in one aspect, requiring no need for cleaning of equipment or system components after the transfer. In this regard, the system of the present disclosure can be operated without having to be used in a clean room environment and without operators having to wear full personal protective equipment.

In one aspect, the present disclosure is directed to an apparatus for the transfer of a biological or pharmaceutical product, such as an active pharmaceutical ingredient. For example, the biological or pharmaceutical product can be in the form of a flowable powder, which in some examples can flow as directed by gravity or by a pneumatic transport system. The apparatus includes a flexible feed sleeve having a first end and a second and opposite end. The flexible feed sleeve defines a tubular passage extending from the first end to the second end. The first end of the flexible feed sleeve is configured to attach to an adjacent structure for receiving the flow of a biological or a pharmaceutical product. For instance, the flexible feed sleeve can be placed in fluid communication with a dispensing container containing the biological or pharmaceutical product.

The apparatus further includes a piping assembly defining a conduit from a first end to a second end. The second end of the flexible feed sleeve surrounds and is secured to the first end of the piping assembly. The second end of the piping assembly is configured to be in fluid communication with a container for receiving the biological or pharmaceutical product from the dispensing container. For example, in one aspect, the receiving container can have a smaller volume than a dispensing container and can be used for later transport and handling of the biological or a pharmaceutical product.

In accordance with the present disclosure, a flexible conduit liner lines the conduit of the piping assembly. The flexible conduit liner is positioned such that a biological or pharmaceutical product flowing through the piping assembly only contacts the flexible conduit liner and prevents contact with a surface of the piping assembly. The flexible conduit liner is configured to be removed and replaced within the piping assembly. In this manner, a biological or pharmaceutical product can flow through a piping assembly without having to later clean the piping assembly once the flexible conduit liner is removed.

In one aspect, the piping assembly includes an access port located along the conduit for periodically removing portions of the flexible feed sleeve or the flexible conduit liner. In one aspect, portions of the feed sleeve are formed after the flow of the product has ceased; the feed sleeve can be crimped and separated into two sealed portions and an unused feed sleeve can be installed over the separated portions. When the access port is surrounded by a flexible containment bag, the flexible containment bag can be configured to extend into the conduit for removing all or a portion of the contaminated flexible feed sleeve and/or the flexible conduit liner after flow of the biological or pharmaceutical product has ceased. In one aspect, the flexible containment bag can include a continuous supply of flexible material such that multiple individual bags can be formed from a continuous supply. The flexible containment bag can be extended into the conduit of the piping assembly for collecting contaminated components. The flexible containment bag can then be inverted and crimped to form sealed individual containment bags that are removed from the access port. In this manner, contaminated disposable elements contained within the conduit can be removed without any residual biological or pharmaceutical product escaping into the atmosphere.

The piping assembly can also include a filter port located along the conduit. The flexible conduit liner can be sealed to a filter that allows filtered air to be released from the piping assembly.

The apparatus of the present disclosure can further include a feed neck collar configured to engage a feed neck of the dispensing container. The first end of the flexible feed sleeve can be removably secured to the feed neck collar using, for instance, any suitable gasket member. The apparatus can further include a flow control device for controlling flow of the biological or pharmaceutical product from the dispensing container into the flexible feed sleeve and piping assembly. In one aspect, the flow control device is configured to be positioned adjacent to an exterior surface of a feed neck of the dispensing container and is configured to restrict the feed neck for controlling flow of the biological or pharmaceutical product. For instance, in one aspect, the flow control device can comprise an iris valve located on an exterior surface of the conduit. The iris valve can be a portion of the feed neck collar or can be spaced from the feed neck collar. In one aspect, the feed neck collar includes an inner ring that cooperates with an outer ring. For example, a feed neck of a dispensing container can be engaged by the feed neck collar by being placed in between the inner ring and the outer ring. In one aspect, the feed neck collar can be movable towards and away from the first end of the piping assembly. For instance, the feed neck collar can be configured to engage the first end of the piping assembly prior to and/or during flow of a biological or pharmaceutical product causing the flexible feed sleeve to collapse vertically along the direction of flow.

The present disclosure is also directed to a method for transferring a flowable powder from a dispensing container to a receiving container. As described above, the powder can comprise a biological or pharmaceutical product. The method includes a step of flowing the powder from a dispensing container through a sealed conduit to a receiving container. The sealed conduit can include a rigid section. The rigid section is lined with a flexible conduit liner. The flexible conduit liner includes a first end and a second and opposite end. The flexible conduit liner prevents contact between the powder and the inside surface of the rigid section of the sealed conduit.

After flow of the powder has ceased, the method further includes the step of containing residual powder within the flexible conduit liner, such as by sealing the first end and sealing the second end of the flexible conduit liner. The flexible conduit liner with sealed ends may be removed from the conduit without allowing any residual powder from contacting clean or unused portions of the sealed conduit or escaping into the outside environment. For example, in one aspect, the sealed conduit can include an access port that is covered by a flexible containment bag. The method can further include the step of inserting the flexible containment bag into the conduit for enveloping the flexible conduit liner. Additionally, or alternatively, contaminated portions of the flexible containment bag can be enveloped by the access port of the flexible conduit liner.

In general, the present disclosure is also directed to a method for transferring a flowable powder through a sealed conduit. The method includes a step of feeding a powder from a dispensing container through a sealed conduit. After the powder has stopped flowing, the sealed conduit can be constricted to form a seal between two portions of the sealed conduit. The sealed conduit can be severed at the point of constriction to form two sealed severed portions, with at least one severed portion forming a seal within the conduit. After severance, a replacement portion of the sealed conduit may be installed over at least one of the severed portions, and the severed portion may be removed from within the replacement portion.

In still another aspect, the present disclosure is directed to an apparatus for the transfer of a biological or pharmaceutical product. The apparatus includes a feed neck collar configured to engage a feed neck of a dispensing container. The feed neck collar is movable towards and away from a piping assembly. The piping assembly defines a conduit having a first end and a second and opposite end. The second end of the piping assembly is configured to be in fluid communication with a container for receiving a biological or pharmaceutical product flowing from a dispensing container through the piping assembly. The piping assembly further includes an access port and a filter port. The first end of the piping assembly is configured to engage with the feed neck collar when a biological or a pharmaceutical product is flowing through the apparatus. In one aspect, the apparatus can further include a flow control device for controlling flow of a biological or a pharmaceutical product from a dispensing container into the piping assembly. The flow control device is configured to be positioned adjacent to an exterior surface of a feed neck of a dispensing container and is configured to constrict the feed neck for controlling flow of the biological or pharmaceutical product. For example, in one aspect, the flow control device comprises an iris valve.

In one aspect, a flexible feed sleeve may extend from the feed neck collar to the first end of the piping assembly. For example, the feed neck collar can define a first engaging portion for engaging a first end of the flexible feed sleeve and the first end of the piping assembly can define a second engaging portion for engaging an opposite end of the flexible feed sleeve. In one aspect, the first engaging portion and the second engaging portion both comprise gasket channels that are configured to receive corresponding gaskets. The gaskets, for instance, can be attached to opposite ends of the flexible feed sleeve.

The apparatus can further include a plate that is movable towards and away from the first end of the piping assembly. The plate can define an opening such that the plate does not interfere with flow of a biological or pharmaceutical product. The plate can be configured to facilitate engagement between the feed neck collar and the first end of the piping assembly. For example, the plate can be connected to the piping assembly by one or more sliding members that permit the plate to move towards and away from the first end of the piping assembly. The apparatus can further include one or more clamping members that clamp the plate to the piping assembly when the feed neck collar is in engagement with the first end of the piping assembly. For instance, the plate can be designed to hold the feed neck collar against the first end of the piping assembly.

BRIEF DESCRIPTION OF THE DRAWINGS

A full and enabling disclosure of the present disclosure is set forth more particularly in the remainder of the specification, including reference to the accompanying figures.

Figure 1:
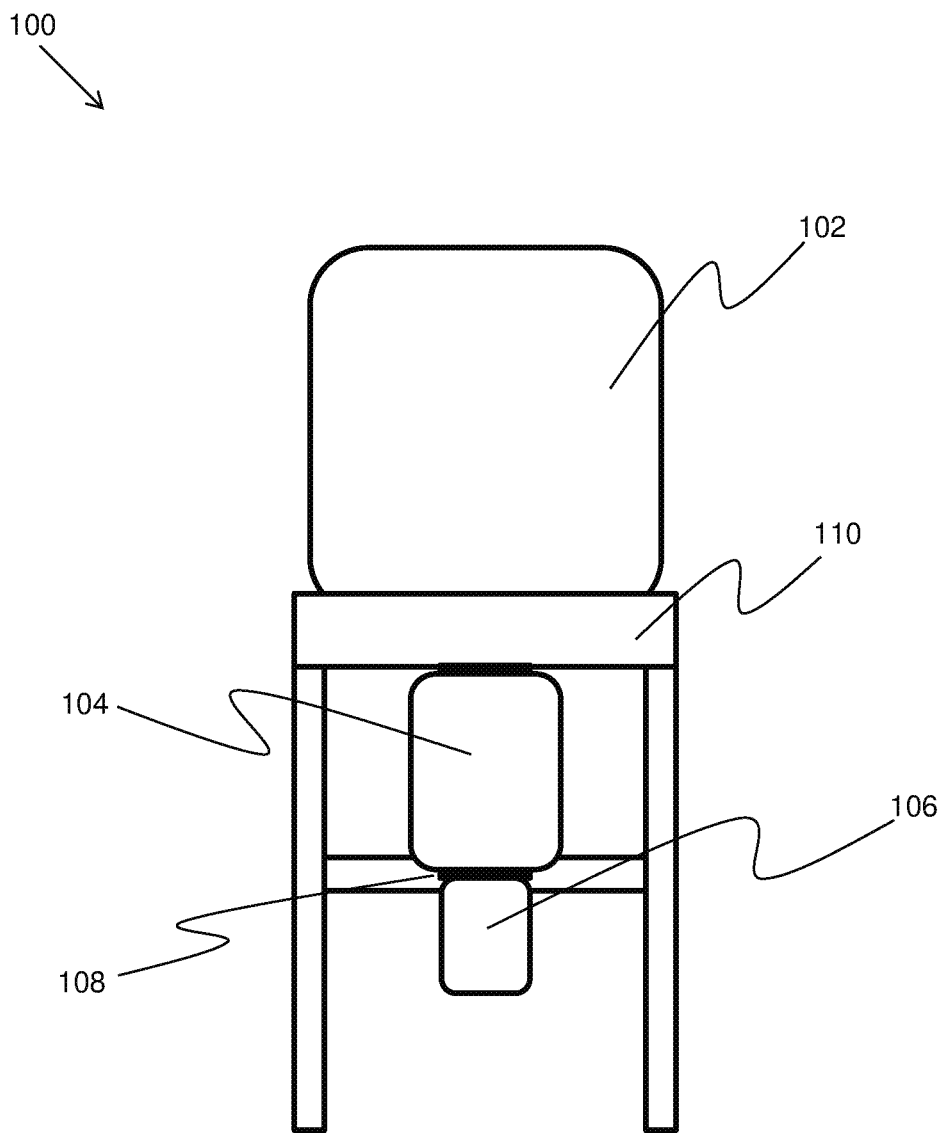
FIG. 1 illustrates one aspect of a transfer station.

Although various features may be depicted in separate figures, it is to be understood that various features represented in separate figures may be advantageously combined into a single aspect. Repeat use of reference characters in the present specification and drawings is intended to represent the same or analogous features or elements of the present invention.

DETAILED DESCRIPTION

It is to be understood by one of ordinary skill in the art that the present discussion is a description of exemplary aspects only and is not intended as limiting the broader aspects of the present disclosure.

In general, the present disclosure is directed to a transfer station for powdery substances, such as active pharmaceutical ingredient (API) seed crystals.

Of particular advantage, the transfer station as disclosed herein offers particulate containment within mandated occupational exposure limits, such as less than about $0.01$ mg/m$^3$, such as less than about $0.001$ mg/m$^3$, such as less than about $0.0001$ mg/m$^3$, even down to essentially complete containment (about $0$ mg/m$^3$). High levels of containment may advantageously reduce and eliminate the extensive decontamination and cleaning processes required after a product changeover.

In an additional advantageous aspect, good containment levels may be maintained without relying upon personal protection equipment (PPE) requirements and biocontainment protocols.

Of additional advantage, a transfer station prepared as herein may reduce the risk of product cross-contamination in some aspects.

In one aspect, the transfer station of the present disclosure receives a powdery component from at least one feed container or dispensing container, such as from a big bag as is commonly used to store and transport pharmaceutical components, especially in a bulk capacity. Some exemplary bags do not have a particular structure or frame to preserve the shape of the bag, forming a flexible or semi-rigid sack. In some aspects, the bags may have an inner layer and an outer layer, wherein the inner layer is a polymer film (i.e., a liner).

Some aspects may employ a frame for holding a feed container in a suitable posture for transfer. In some examples, the bags may be elevated, such as hung from a wall, ceiling, or free-standing structure, such as in FIG. 1. In one example, the frame may have a plurality of legs. A platform 110 may support a feed container on top of the frame.

A neck or spout protruding from the feed container may pass through a neck ring for passage into additional components of the transfer station. In some examples, the neck is integrated into the feed container structure, and in other examples, the neck is added onto an existing feed container for use with a transfer station prepared as disclosed herein.

In one aspect, the frame also includes an alignment ring 108. The alignment ring may, for example, align subcomponents of the transfer station with the neck ring of the frame platform while providing structural support. For example, FIG. 1 depicts one aspect of a transfer station 100 wherein a feed container 102, transfer system 104, and fill container 106 are aligned by the alignment ring 108.

The bag frame may form a housing or structure for the entire transfer station as disclosed herein, such as in FIG. 1. Bag frames may, in some aspects, hold one or more bags and one or more transfer stations. For example, a single frame may contain multiple transfer stations, such as 2, 3, 4, 5, or 10, or more, to facilitate a compact floor plan.

Figure 2:
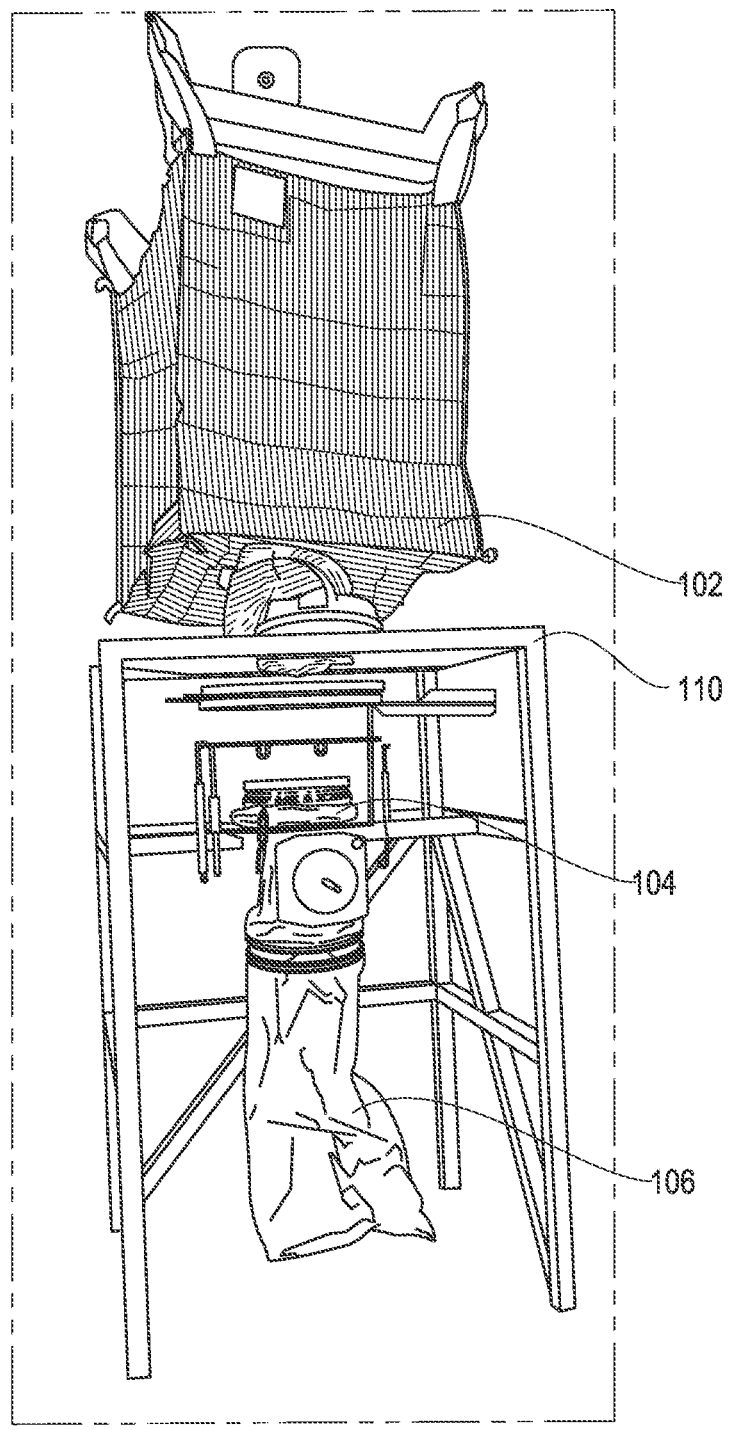
FIG. 2 illustrates another aspect of a transfer station.

One aspect of a transfer station is depicted in FIG. 2. A container, such as a big bag 102, is hoisted over the frame 110 and into alignment with the transfer system 104. Of particular advantage, the components of the transfer system supported by the frame 110 may form an integrated unit while different bags 102 are installed or removed. For instance, the transfer station frame 110 may be fixed in place and, in some cases, the fill container 106 may be filled without any additional handling or manipulation of the fill container 106 itself. In another aspect, the transfer station frame 110 and an associated container 102 may be mobile and, in some cases, may be relocated adjacent to various fill containers 106 which may be located in the same or different locations. In this manner, the transfer station of the present disclosure affords great flexibility.

Figure 3:
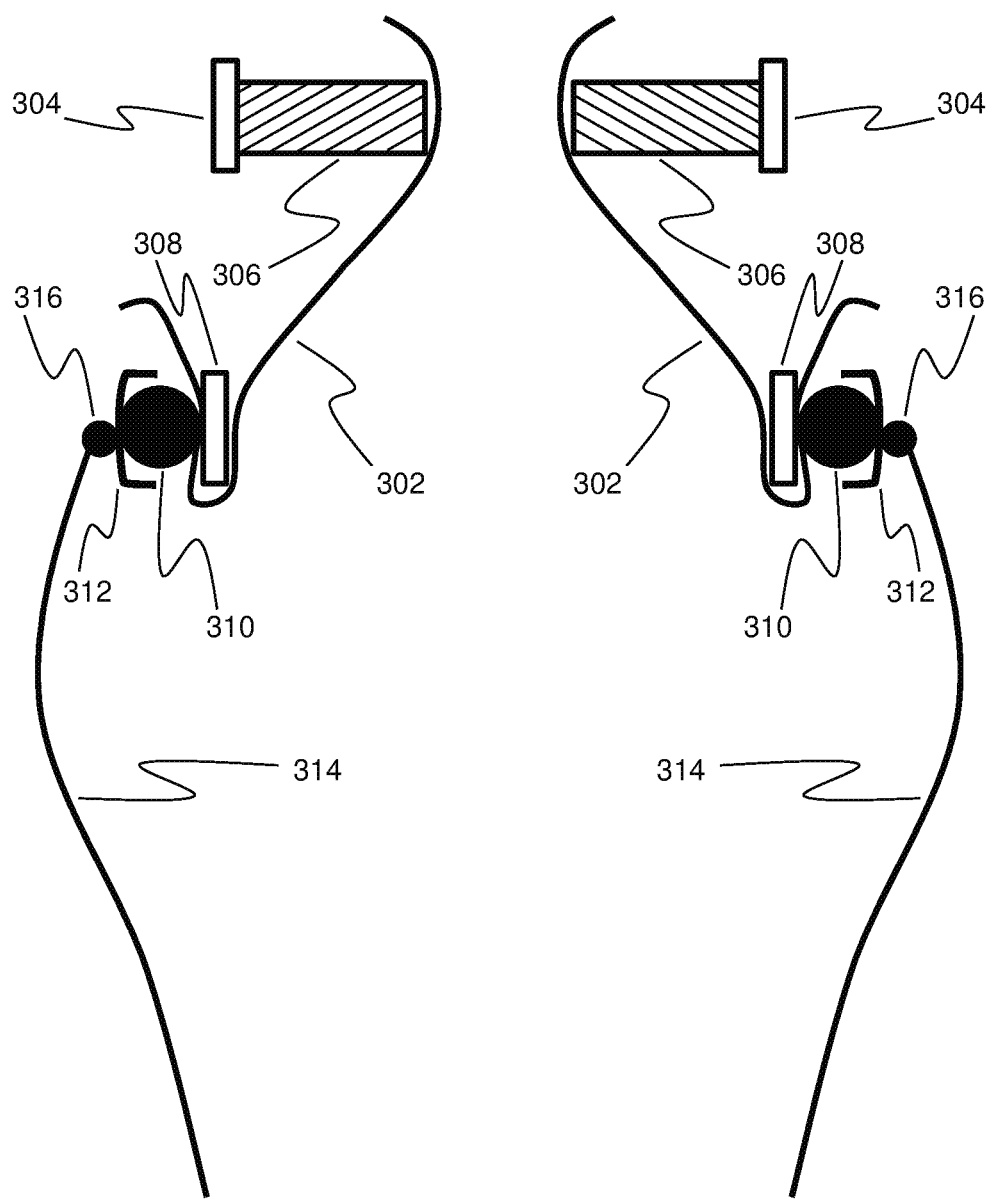
FIG. 3 illustrates a section view of one aspect of a transfer station.

In one aspect, a feed neck 302 extending from the feed container is manipulated by a flow control device as shown in FIG. 3. The feed neck may optionally be a liner within the container, such as a polymer film liner within a big bag. In one example, the feed neck may be fed through an iris valve 304. The iris valve 304 may impinge upon an exterior surface of the feed neck 302 to control flow of a powdery component; the web 306 of the iris valve 304 wraps around the feed neck 302 and constricts the passageway therein. One advantage of manipulating the flow entirely external to the passageway of the flow is that the flow control device does not compromise the integrity of the passageway boundary.

The flow control device may be manually actuated or may be automated, optionally in conjunction with a mass control system. For example, a mass control system could, in some aspects, sense the change in mass of the feed container, the fill container, or both and control the flow control device to achieve a particular target change in mass.

The feed neck extending from the feed container may, in some aspects, be captured by a feed neck collar.

Captivity, as used herein, generally indicates a mechanically secure relationship. In some cases, capture may reflect a sealed relationship at the joint between two components. In some examples, a gasket, such as an o-ring, may be captured within a groove, lip, or slot; a sheet or film may be captured within a clamp, crimping device, or underneath an elastic element; an elastic band, such as an elastic o-ring, may be captured by friction forces on the outside of an object encompassed by the band. Additionally, capture may reflect the use of a temporary or permanent adhesive, such as a chemical adhesive or a thermal bond (e.g., weld). Elements may be captured by distinct other elements, or, in some cases, elements may contain an integral feature, such as an elastic gasket, which permit self-capture against other elements. It is to be understood that although some elements are described as being captured by other elements, each element may, in some aspects, be responsible for the capturing, and the method of capture may be adapted or reconfigured while remaining within the scope of the present disclosure.

Furthermore, with regard to elements which are described as captured, secured, coupled, or otherwise engaged with another element, it is to be understood that said elements may be arranged in a permanent configuration or, alternatively, in a removable configuration.

In one example, the feed neck extending from the feed container may be captured by a feed neck collar as shown in FIG. 3. For example, the distal end of the feed neck may be partially inverted as shown in FIG. 3 to pass inside an inner ring 308 and also be captured between the inner ring 308 and an outer ring 312 by a gasket 310. Any suitable gasket member may be used as a gasket as a gasket 310, including, for example, elastic gaskets, rigid gaskets, semi-rigid gaskets, single-use gaskets, and reusable gaskets. The gasket 310 may, in some aspects, be at least partially captive within a recessed channel or groove, such as within the outer ring 312 shown in FIG. 3. In some cases, an outer ring 312 includes a cinching or clasping mechanism to compress the gasket 310 between the feed neck and the inner ring 308.

A feed sleeve 314, such as a flexible feed sleeve, may contain a gasket member 316 on a first end of the flexible feed sleeve and be captured by the feed neck collar. In FIG. 3, the feed neck collar captures the feed sleeve 314 by the friction of the elastic gasket 316 on the outer ring 312. However, in some examples, one or more grooves, which may be directly adjacent or spaced apart, may be provided for the secure capture of one or more gaskets 316.

Figure 4:
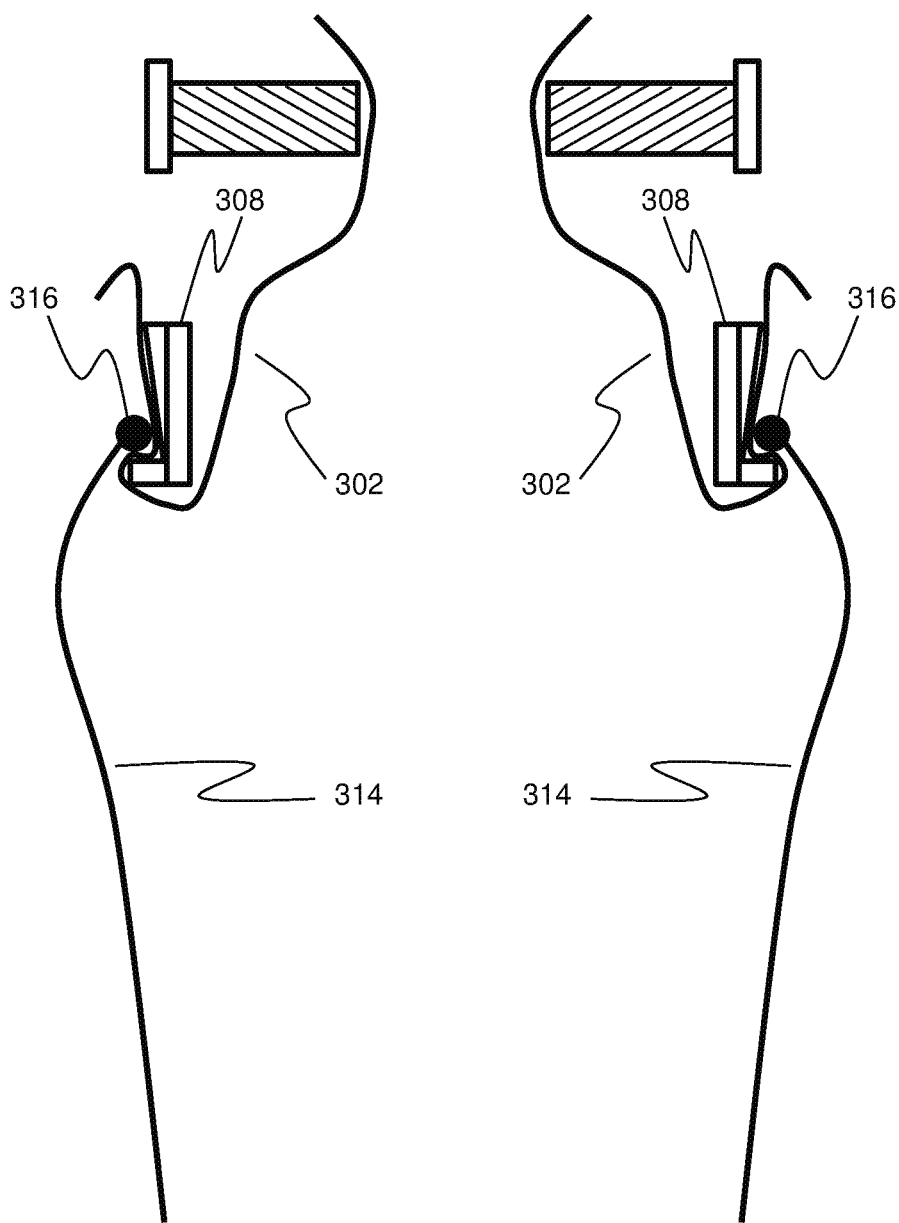
FIG. 4 illustrates a section view of another aspect of a transfer station.

In another example in FIG. 4, the outer ring 312 is not used at all, and the inner ring 308 is extended to have a sloped recess on its exterior surface so that any gasket 316 placed around the circumference of the inner ring 308 will settle into the same location, providing a seal for both the feed neck 302 and the feed sleeve 314. In other aspects, the sloped recess may be employed in a similar manner on the exterior of the outer ring 312. In other aspects, the inner ring 308 may further contain grooves for additional gaskets or clamps to individually secure the feed neck 302 to the inner ring 308. Aspects may also provide clamps around the feed sleeve gasket 316 to increase the strength of the seal.

Figure 5:
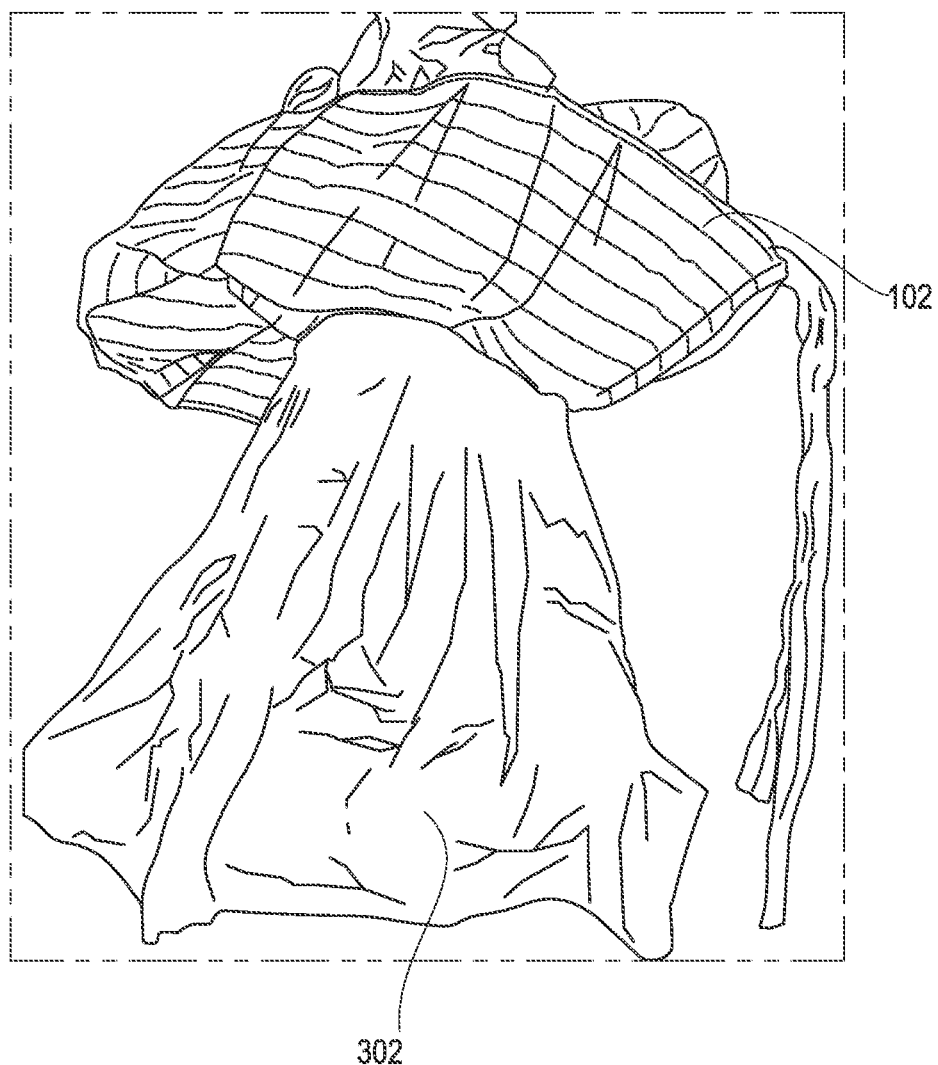
FIG. 5 illustrates one aspect of the neck of a big bag.
Figure 6:
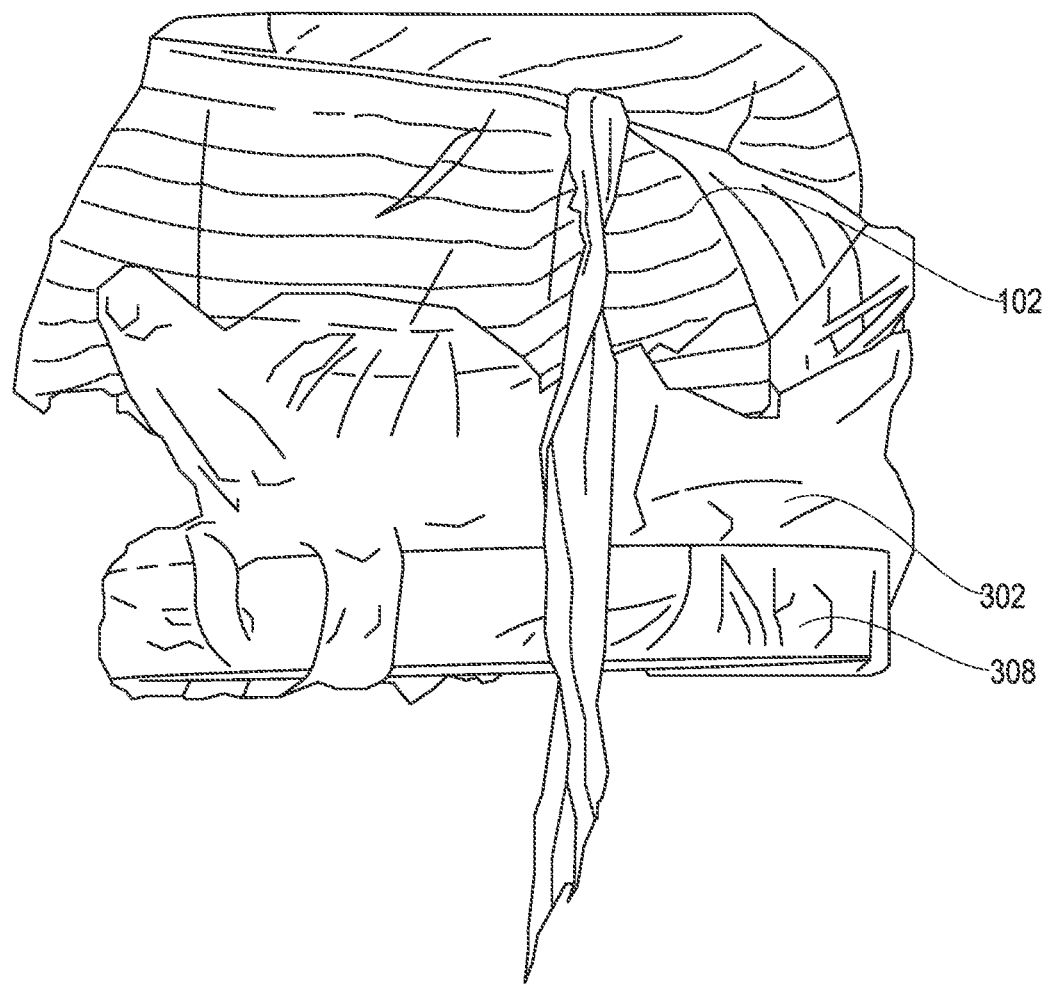
FIG. 6 illustrates one aspect of the neck of a big bag.
Figure 7:
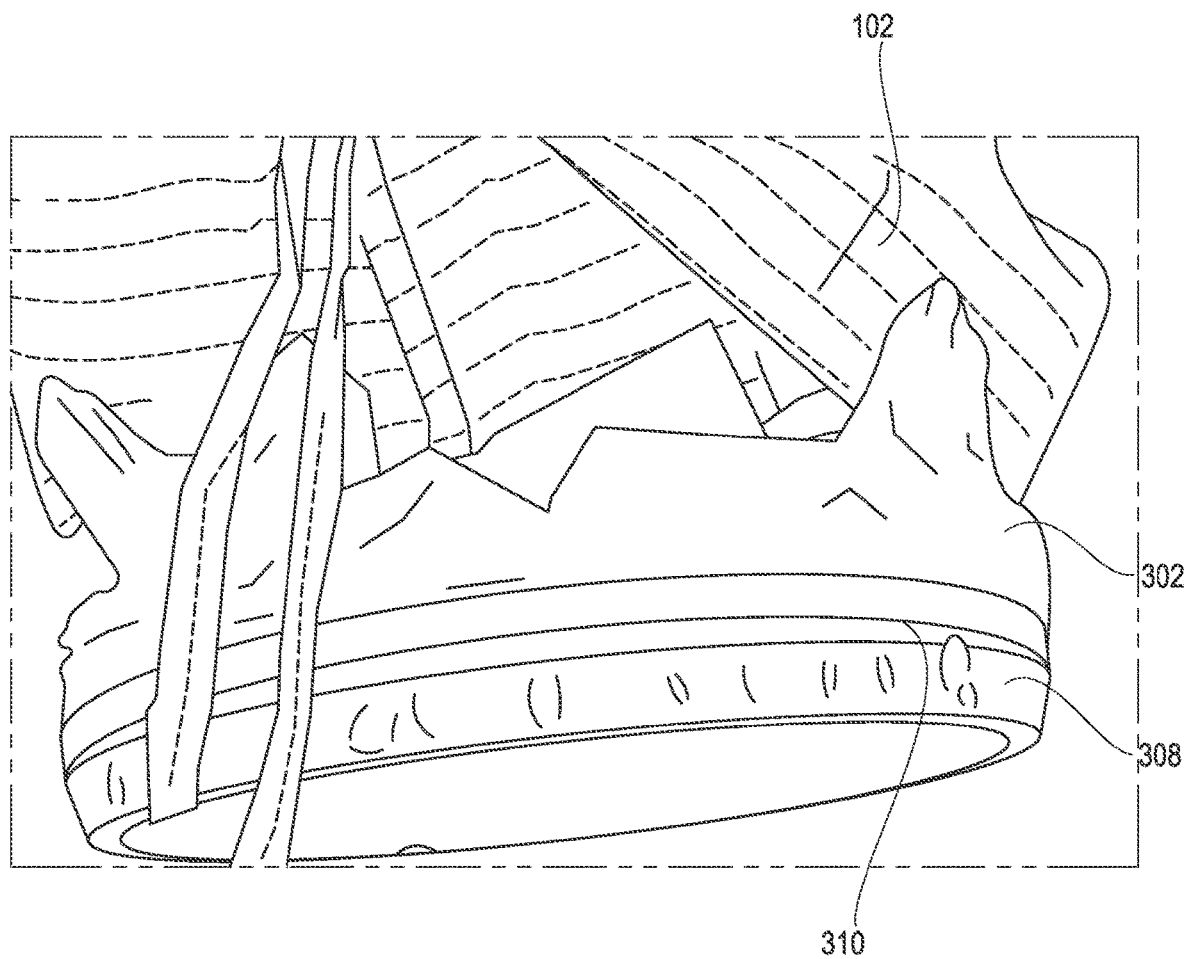
FIG. 7 illustrates one aspect of the neck of a big bag.

In one aspect, the feed neck 302 is as shown in FIG. 5. In particular, a big bag 102 may have multiple layers, and the feed neck 302 may comprise a polymer film liner of the bag 102. As shown in FIG. 6, the feed neck 302 may pass through the interior of an inner ring 308 and invert, as is similarly shown in section view in FIG. 3. A gasket 310 may be placed around the inner ring 308 to capture the feed neck 302 against the inner ring 308, as shown in FIG. 7.

Figure 8:
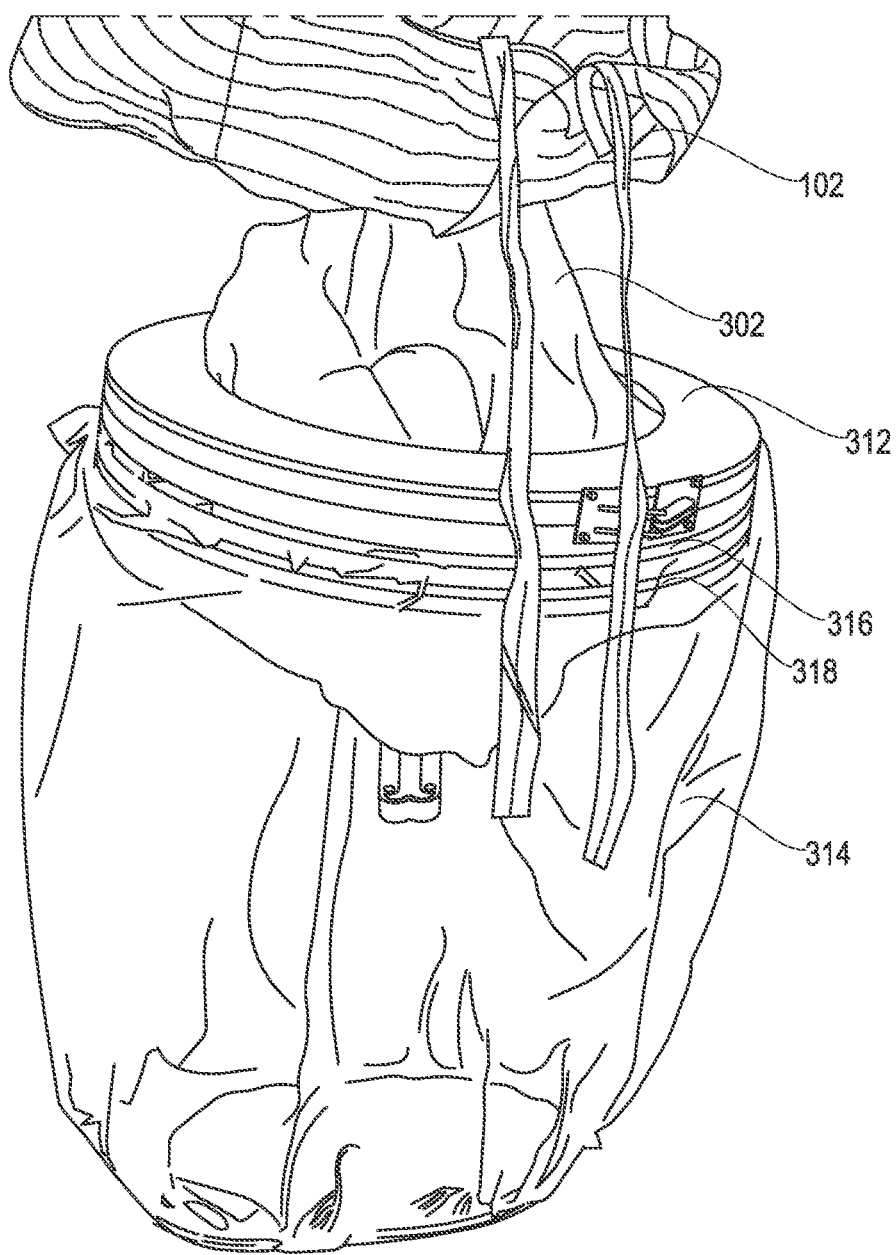
FIG. 8 illustrates one aspect of the feed sleeve.

In one instance, the outer ring 312 is positioned around the inner ring 308 as shown in FIG. 8. The outer ring 312, in the pictured aspect, contains two grooves which capture the feed sleeve gasket 316 in an upper groove and a remnant gasket 318 in a lower groove. In some aspects, the remnant may be removed, vacating the lower groove containing the remnant gasket 318. Accordingly, the feed sleeve gasket may be shifted down to the lower groove previously occupied by the remnant gasket 318. In some aspects, additional sleeves or gaskets may be attached to the outer ring 312 into the upper groove such that the cycle may be repeated.

In this manner, a sealed conduit may be created between the interior of the feed container and the feed sleeve. In some aspects, such as more compact aspects, the exterior surface of the flow control device (e.g., the iris valve) may act as the feed neck collar, as in FIG. 10.

Figure 9:
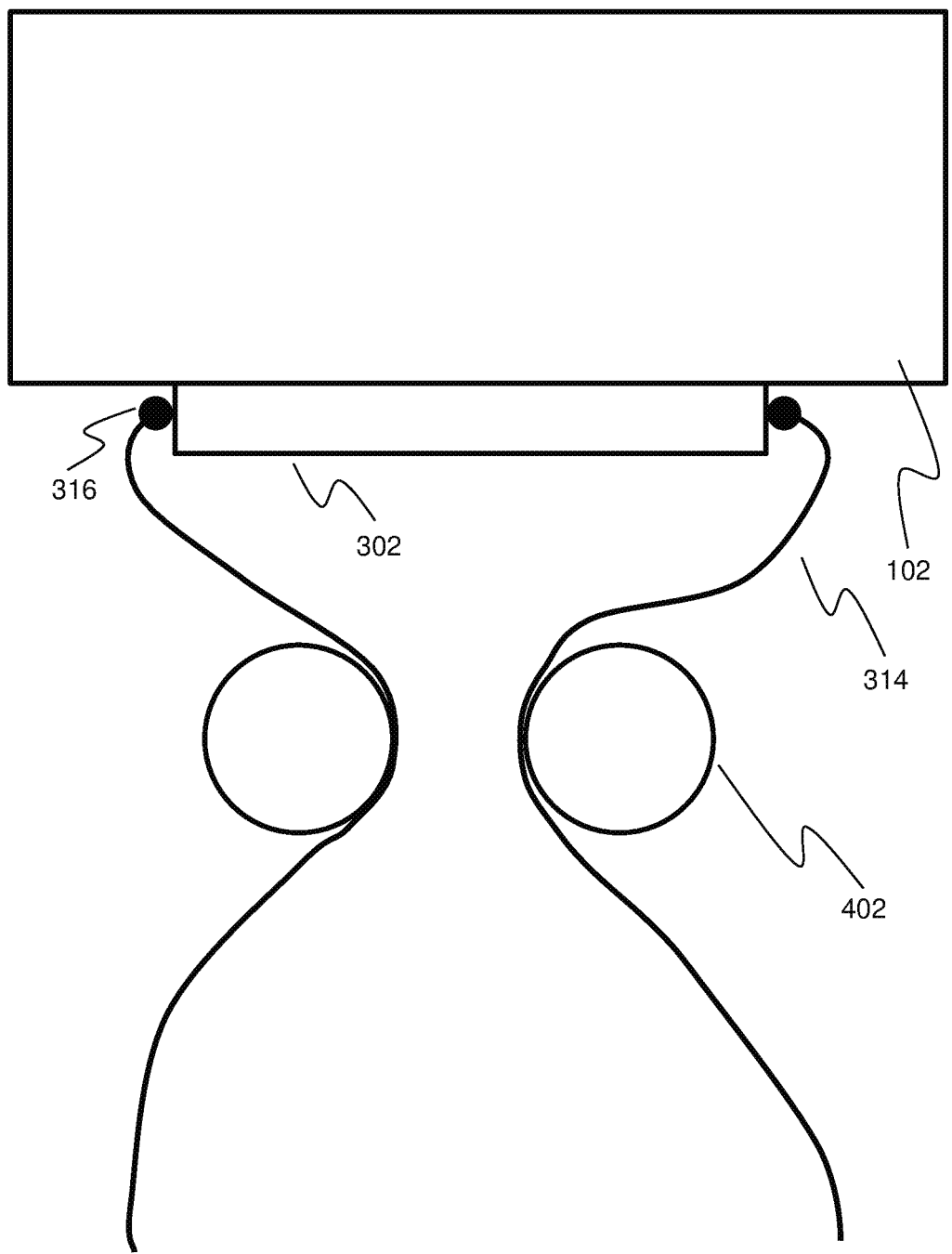
FIG. 9 illustrates a section view of one aspect of a transfer station.

The aspect in FIG. 9 demonstrates the flexibility of the presently disclosed transfer station. For instance, the flow control device may be any variety of implement which can control flow from the exterior of the of the flow passageway. In FIG. 9, the flow control device comprises a set of parallel bars 402 situated around the feed sleeve 314. At least one parallel bar 402 may be controlled to compress the feed sleeve 314 between the two parallel bars. In this manner, the feed neck 302 of a feed container 202 may be integrated into the feed neck collar and provide a more compact aspect, wherein the feed sleeve gasket 316 is captured directly on the feed neck 302. Such an example may be useful when the feed container 202 is a rigid container, such as a drum. The feed neck 302 may then be, for example, affixed to the drum, such as by threading, without using a flexible feed neck.

Figure 10:
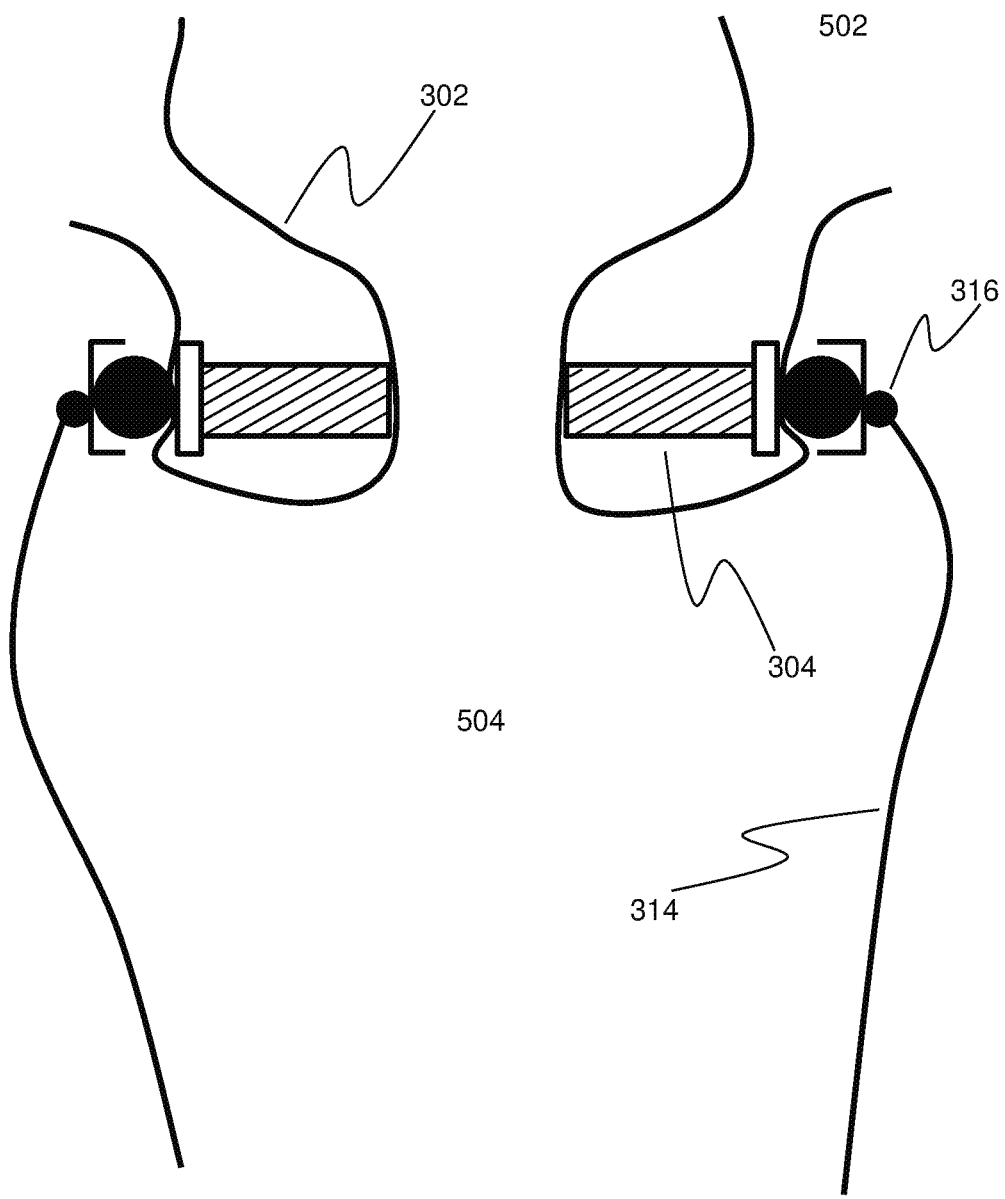
FIG. 10 illustrates a section view of another aspect of a transfer station.

In general, when the flow control device 304 is opened, as in FIG. 10, a sealed conduit is formed between the feed neck 302 and the feed sleeve 314. In the interest of containing the powdery component, two atmospheres may be distinguished: a room atmosphere 502 and a contaminated atmosphere 504. The captivity of the feed sleeve 314 and the feed neck 302 to the feed neck collar maintains an uncompromised barrier between the room atmosphere 502 and the contaminated atmosphere 504.

The room atmosphere 502 is generally the ambient atmosphere in which the operators of the transfer station are present. In some cases, the exterior of the container from which the powder is being transferred is exposed to the room atmosphere. In general, the room atmosphere maintains low particle counts of the powder being transferred, such as within mandated occupational exposure limits (measured according to guidelines such as CEN EN 689 and/or TRGS 402), such as less than about 0.01 mg/m$^3$, such as less than about 0.001 mg/m$^3$, such as less than about 0.0001 mg/m$^3$, even down to essentially a complete absence of the powder (about 0 mg/m$^3$). On the other hand, the contaminated atmosphere 504 exists within the transfer system and comprises the gas (e.g., air) and other components (e.g., films, gaskets, liners, etc.) which have contacted at least one of (i) the bulk powder itself (e.g., in the bag or bags) or (ii) surfaces which the bulk powder has directly contacted (e.g., the various sleeves and/or liners), including surfaces subject to ancillary powder exposure (e.g., liners within adjacent accesses as described herein). In general, the two atmospheres described herein are distinct, even if the atmospheres are in fluid communication via a filtration device. For instance, the contaminated atmosphere may exhaust into the room atmosphere through a filtration device in some aspects, maintaining the distinction between the unfiltered, contaminated atmosphere and the room atmosphere. In some examples, the atmospheres may be distinguished by physical location (e.g., within the transfer system) or by particulate concentration.

Figure 11:
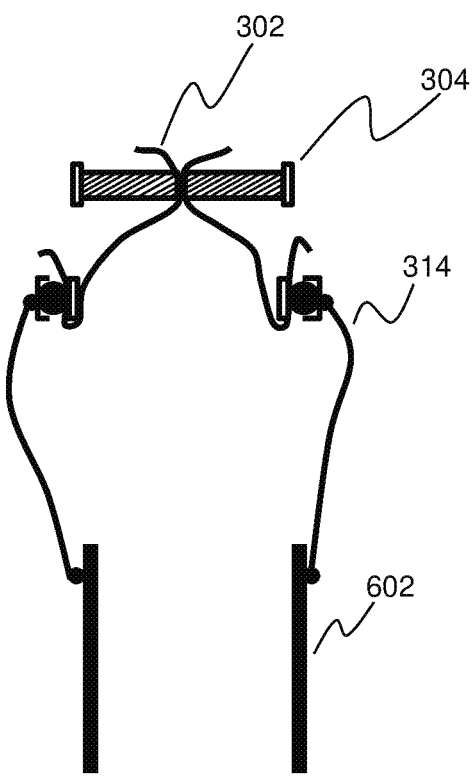
FIG. 11 illustrates a section view of another aspect of a transfer station in a first position.

In one aspect, the flexible feed sleeve 314 forms a tubular passage extending from the first end to a second and opposite end which may be connected, coupled, secured, or otherwise engaged with a first end of a piping assembly. For instance, a product may pass through the sealed conduit formed by the feed neck 302 and the feed sleeve 314 into a piping assembly for further processing or for transport. The piping assembly is generally rigid or semi-rigid. For example, as shown in FIG. 11, a product may pass into a piping assembly inlet 602 to be directed to a packaging device. For example, as shown in FIG. 11, the piping assembly inlet 602 and the captured end of the feed neck 302 are spaced a distance apart, forming a gap spanned by the feed sleeve 314. In some aspects, the feed neck collar and the piping assembly inlet 602 may be mounted on a moving assembly. In other aspects, the feed neck collar may be suspended by the flexible feed neck of the bag while the piping assembly inlet 602 is rigidly affixed to a frame.

Figure 12:
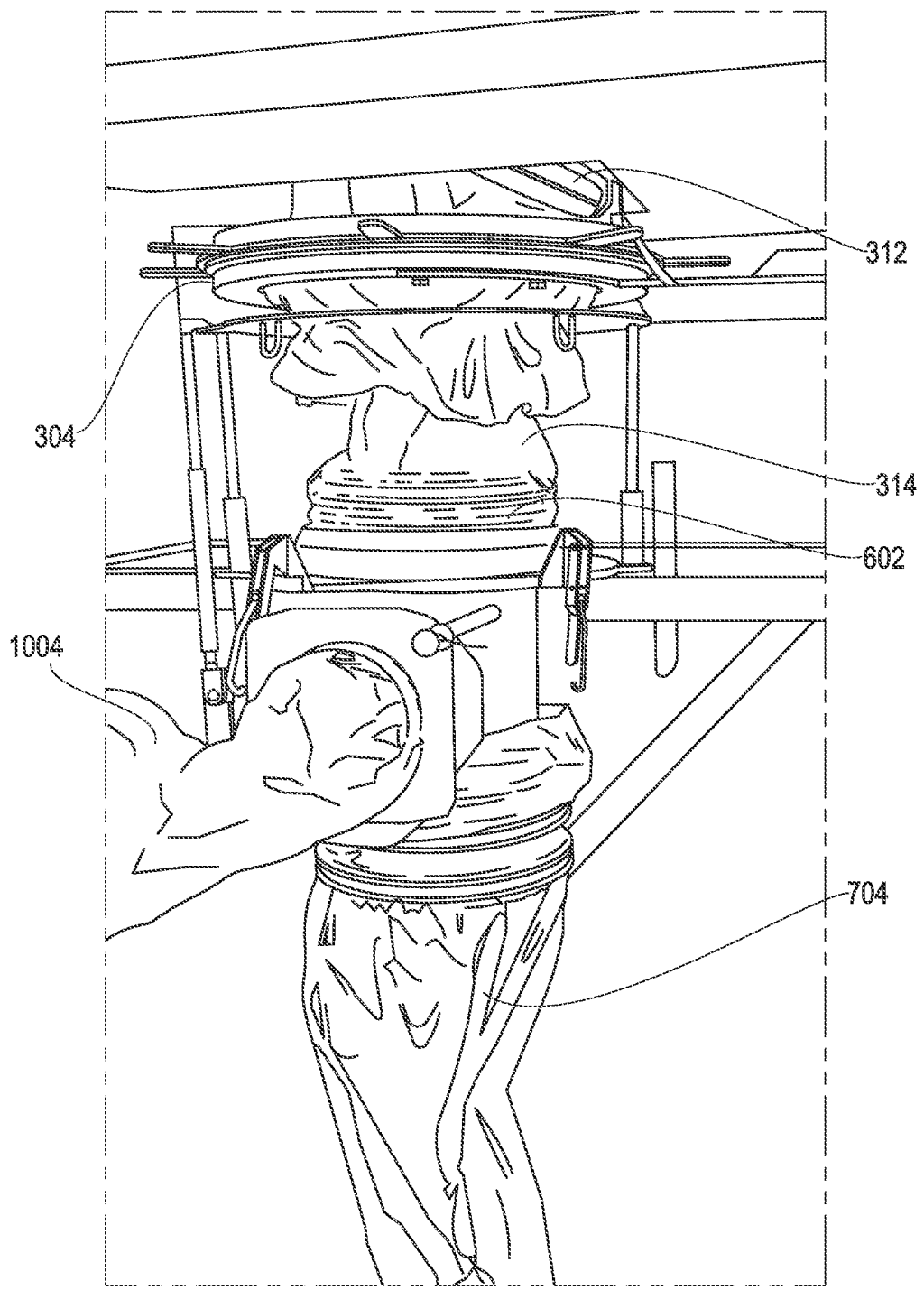
FIG. 12 illustrates one aspect of a transfer station in a first position.

As shown in FIG. 12, the feed sleeve 314 forms a sealed, optionally tubular, conduit between the feed neck (shown inside the outer ring 312) and the piping assembly inlet 602. Additionally, the feed sleeve 314 passes through an iris valve 304. While the flow control device may act on the exterior of the feed sleeve in some aspects, the flow control device may also constrict the feed neck.

Figure 13:
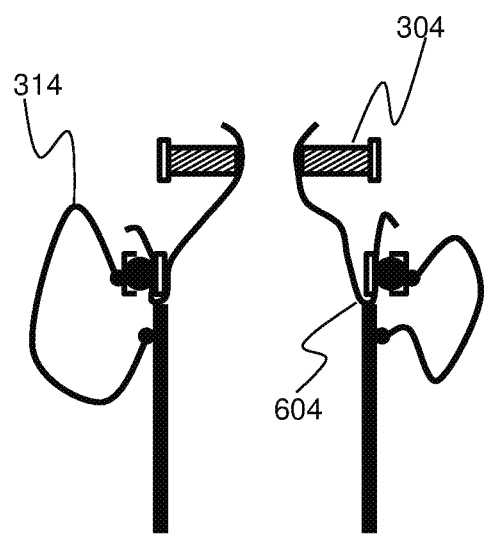
FIG. 13 illustrates a section view of another aspect of a transfer station in a second position.
Figure 14:
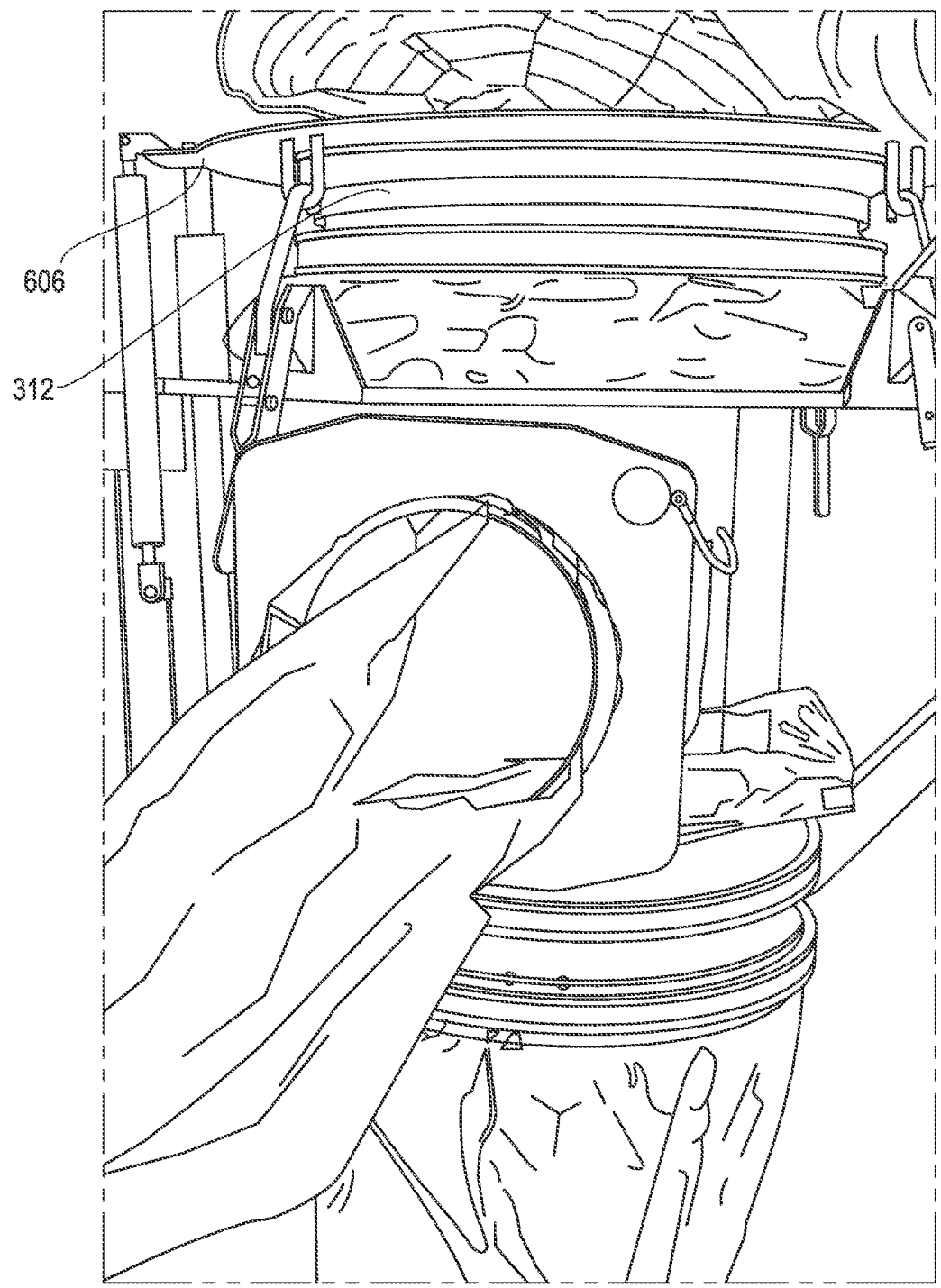
FIG. 14 illustrates one aspect of a transfer station in a second position.

For instance, the components may be brought together to form an annular contact point 604, as shown in FIG. 13, by passing the outer ring 312 through the flow control device 304 to be adjacent to the first end of the piping assembly. The contact point 604 may prevent, for example, any powdery component from escaping through the aforementioned gap between the feed neck and the piping assembly and accumulating outside the piping assembly inlet 602 and inside the feed sleeve 314. In one aspect, the components may be clamped or otherwise temporarily affixed in the adjacent position. For example, one clamped arrangement is shown in FIG. 12. For instance, the clamp may comprise a sliding plate 606 (optionally sprung and/or damped) which applies even pressure across the top of the outer ring 312 to form a secure seal at the contact point 604.

The moving assembly may be activated manually or may be automated in part or in whole. For example, the feed neck collar, the piping assembly, or both may be configured to slide between the configurations shown in FIGS. 11-14. The relative motion between the feed neck collar and the piping assembly may cause deformation of the feed sleeve. For instance, in one aspect, the flexible feed sleeve may collapse along the axis of motion as the feed neck collar and the piping assembly move toward each other, while the flexible feed sleeve may extend as the feed neck collar and the piping assembly move away from each other.

In some examples, mechanical or electromechanical controls may prevent the flow control device 304 from being opened unless the contact point 604 is formed securely. The contact point 604 may be any variety of surface, such as a sealing flange. In some examples, the contact point 604 may include a gasket. In some aspects, the feed neck collar is configured to mate or otherwise engage with the piping assembly inlet 602 to increase the security of the contact point 604 (e.g., with grooves, tapers, interlocking components, or otherwise).

Figure 15:
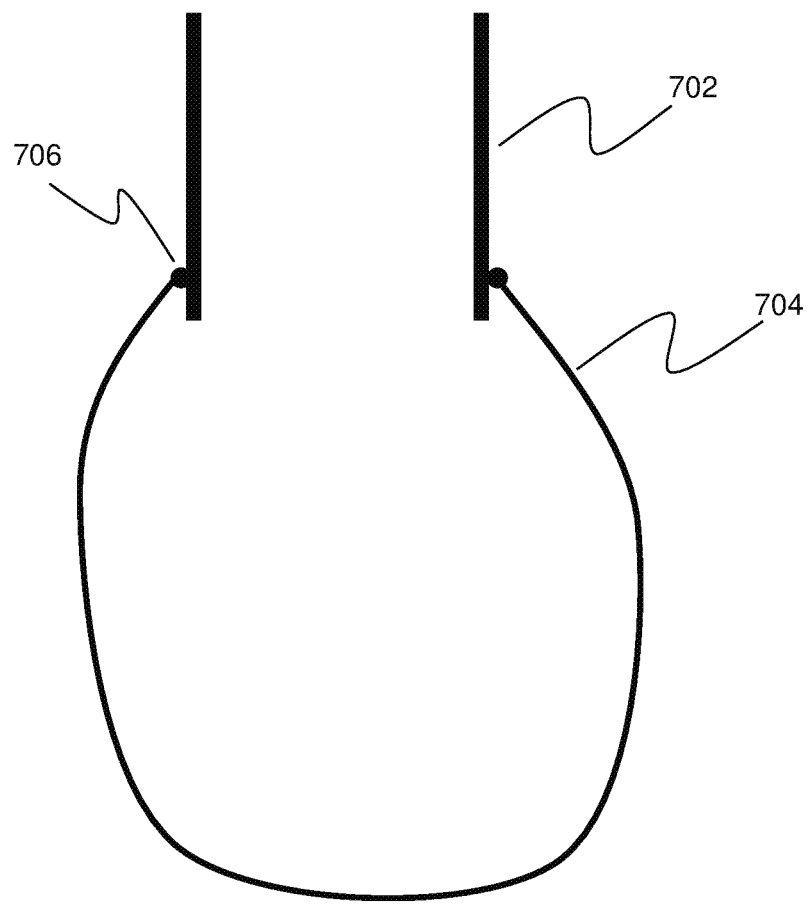
FIG. 15 illustrates a section view of one aspect of a container for a transfer station.

After the powdery component passes through the piping assembly inlet 602, some aspects may direct the powder to a packaging device which is in fluid communication with the piping assembly. Fluid communication, in this context, also indicates the fluid-like flow of a powder or powdery component. In some examples, such as shown in FIG. 15, a piping assembly outlet 702 located at a second end of the piping assembly may direct powder though a fill sleeve and into a container. In some examples, the fill sleeve forms a container, such as a fill bag 704. The fill bag 704 may contain a gasket 706 captured around the piping assembly outlet 702.

A fill bag may include any variety of bag, sack, container, or continuous (endless) liner. For example, a polymer bag or sack may be filled, having a variety of volumes, such as greater than about 1 mL, such as greater than about 10 mL, such as greater than about 100 mL, such as greater than about 1 L, such as greater than about 10 L, such as greater than about 100 L, such as greater than about 1000 L, such as greater than about 10000 L. In some aspects, the bag or sack volume may be less than about 10000 L, such as less than about 1000 L, such as less than about 100 L, such as less than about 10 L, such as less than about 1 L, such as less than about 100 mL, such as less than about 10 mL, such as less than about 1 mL, although it is contemplated that the transfer station of the present disclosure is suitable for the filling of containers of any size. Containers may include rigid drums or any other rigid or semi-rigid vessel with or without a liner, having similar volumes to a bag or a sack as above. Continuous liners may be used in some examples where individual product volumes are defined by pressing, crimping, or otherwise sealing (adhering) two portions of the liner together to form one end of a first defined volume. After a product is deposited within the liner above the sealed portion, a second end of the defined volume is formed by pressing, crimping, or otherwise sealing a second two portions of the liner together. A first sealed volume containing the product is thus created between the first and second sealed portions. The second sealed portion may form one end of a second defined volume for the storage of additional product in a second sealed volume.

In some aspects, at least one fill bag gasket 706 is applied external to the bag itself. In other aspects, at least one fill bag gasket 706 is integral to the bag, such as welded to or captured within a fringe or hem of the bag opening. Selection of external gaskets, integral gaskets, or both may permit reusability (e.g., with external gaskets) or single-use (e.g., with integral gaskets).

Just as the feed sleeve 314 may provide a sealed conduit between the feed neck 302 and the piping assembly inlet 602, a fill sleeve may provide a sealed conduit between the piping assembly outlet 702 and a container, chute, or conduit. For example, a rigid container, in some aspects, may have a fill container collar analogous to the feed neck collar, and a fill sleeve may be captive to both the piping assembly outlet and the fill container collar, analogous to how the feed sleeve 314 may be captive to both the feed neck collar and the piping assembly inlet 602.

Figure 16:
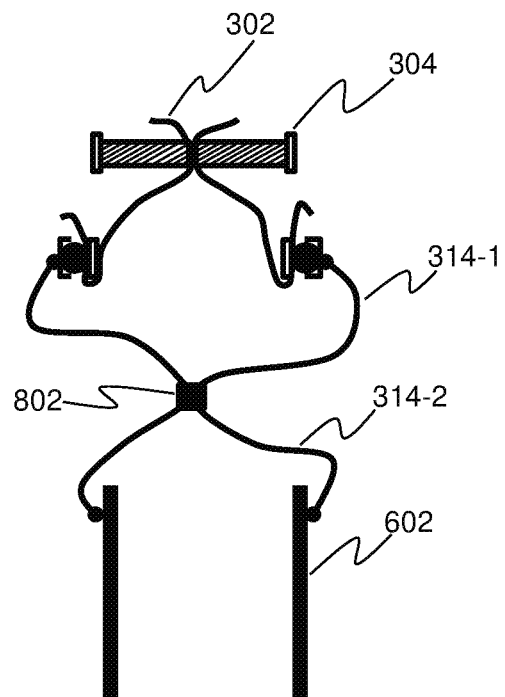
FIG. 16 illustrates a section view of one aspect of a transfer station.
Figure 17:
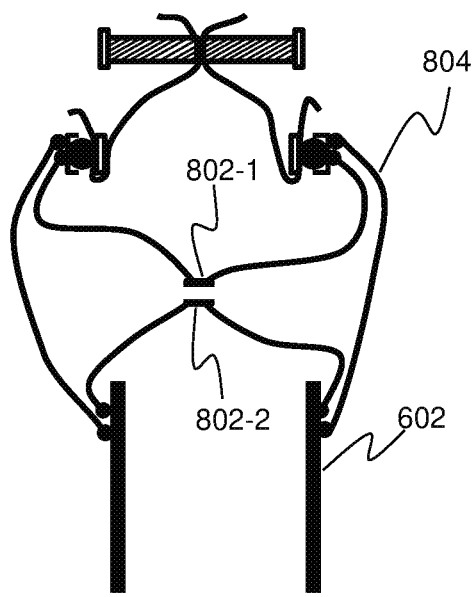
FIG. 17 illustrates a section view of one aspect of a transfer station.
Figure 18:
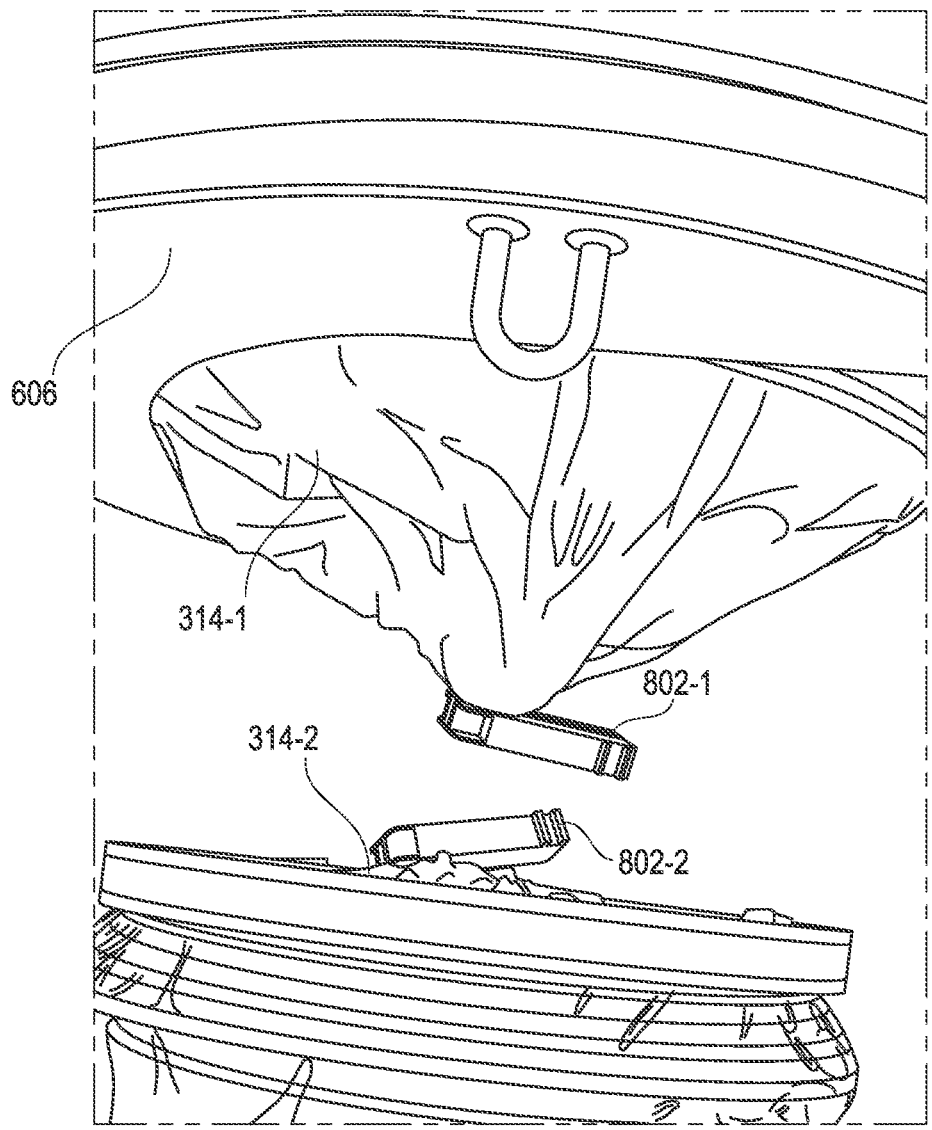
FIG. 18 illustrates one aspect of a transfer station.

In some aspects, after a container is filled, the feed sleeve 314 is contaminated and is desired to be replaced without exposing the room atmosphere 502 to the contaminated atmosphere 504. To this end, the feed sleeve may be crimped, such as with a crimp ring 802 as shown in FIG. 16. The crimp ring 802 divides the feed sleeve into two portions: an upper remnant 314-1 and a lower remnant 314-2. The crimp ring 802 may be cut or otherwise subdivided into an upper crimp 802-1 attached to the upper remnant 314-1 and a lower crimp 802-2 attached to the lower remnant 314-2, as shown in FIG. 17 and FIG. 18. The upper and lower crimps contain the contaminated atmosphere 504 within the respective remnants. After the crimp ring 802 has been severed, or subdivided, a new feed sleeve 804 may be situated over the upper and lower remnants, surrounding both the remnants and the gaskets of the remnants, as shown in FIG. 17. The gaskets of the new feed sleeve 804 may also be captive to the feed neck collar and the piping assembly inlet, sealing off the remnants from the room atmosphere 502.

In a similar fashion, some aspects employing a contaminated fill sleeve may be crimped, subdivided, and subsequently enveloped by a new fill sleeve. In some examples, after subdividing the crimp ring on the fill sleeve, the filled container to which the lower remnant of the fill sleeve is attached may be removed and a new container may be put in its place. Subsequently, the new fill sleeve may be captured by the piping assembly outlet and the fill container collar, such as a collar on a new container, sealing off the new container from the room atmosphere 502. Additionally, the filled container remains sealed from the room atmosphere 502 by the lower remnant and may be suitable for further handling or packaging steps.

Figure 19:
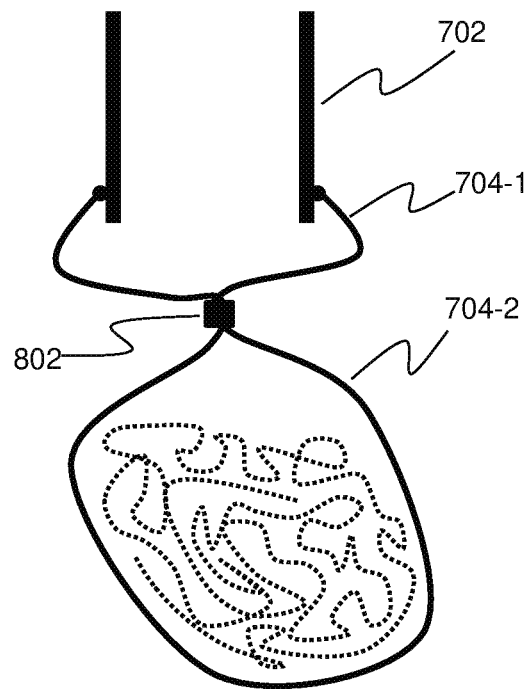
FIG. 19 illustrates a section view of one aspect of a transfer station.
Figure 20:
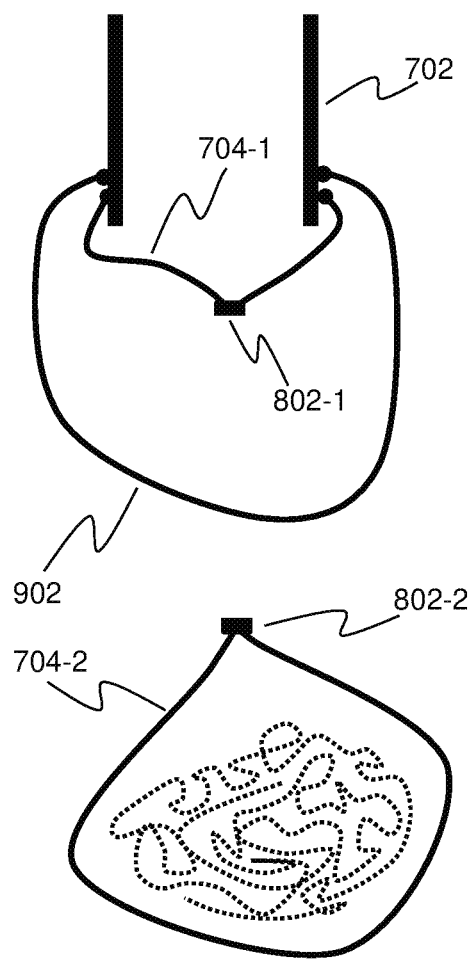
FIG. 20 illustrates a section view of one aspect of a transfer station.

Additionally or alternatively, aspects with a fill bag 704 may be handled as shown in FIG. 19. The fill bag may be crimped, such as with a crimp ring 802, forming an upper remnant 704-1 and a lower filled remnant 704-2. When the crimp ring 802 is subdivided into an upper crimp 802-1 and a lower crimp 802-2, the lower filled remnant 704-2 remains sealed by the lower crimp 802-2 and may be removed for further handling or packaging steps. Subsequently, a new bag 902 may be situated around the pipe assembly outlet 702, enveloping the upper remnant 704-1 and the gasket of the upper remnant, as shown in FIG. 20. In some aspects, wherein the fill bag 704 is fashioned from a continuous liner, a new bag is formed by extending the liner portion which is the upper remnant or by extending a new liner portion over the upper remnant and forming a new bag from the new liner portion around the upper remnant.

Figure 21:
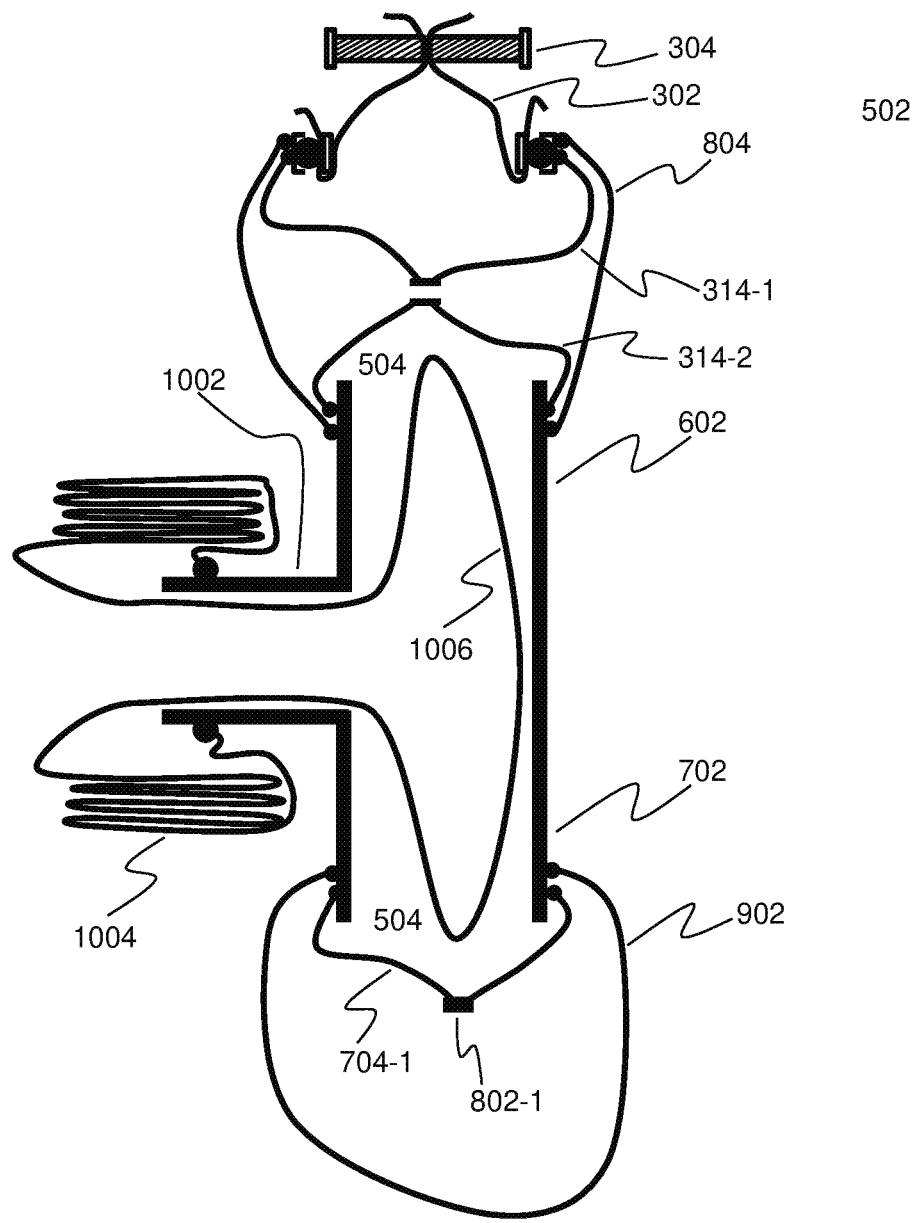
FIG. 21 illustrates a section view of one aspect of a transfer station.

A flexible containment bag may, in some aspects, be situated circumferentially around one orifice or access port of the piping system. In some aspects, the flexible containment bag may be formed by a portion of a continuous liner. For example, some aspects of the piping assembly may have an access port 1002, as shown in FIG. 21. The access port 1002 may be enveloped by a flexible containment bag 1004. The flexible containment bag 1004, which may be a continuous liner, may be inverted and inserted into the access to form a lined access 1006. The lined access 1006 may permit any or all of the remnants (e.g., 314-1, 314-2, and 704-1) to be removed from their points of capture (e.g., the feed neck collar, the piping assembly inlet, and the piping assembly outlet, respectively) without breaching the barrier between the room atmosphere 502 and the contaminated atmosphere 504.

Figure 22:
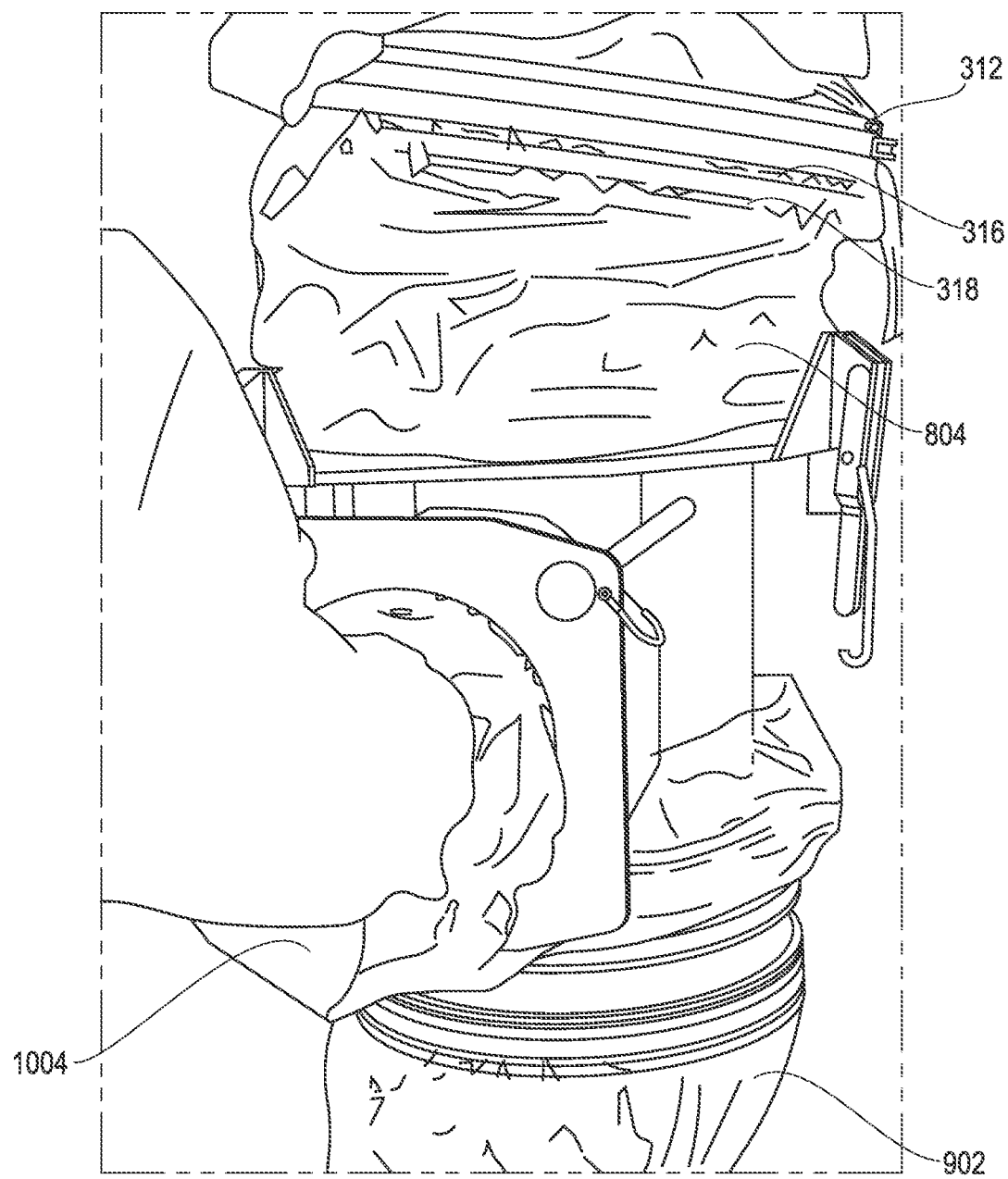
FIG. 22 illustrates one aspect of a transfer station.

In one aspect, a user may reach into the access port as shown in FIG. 22 and remove the remnants by a hand shielded by the lined access 1006. After the removal of the remnants, the new feed sleeve gasket 316 may be situated in the position previously inhabited by the remnant gasket 318 as discussed above. However, it is to be understood that a plurality of grooves or gasket locations may be provided such that the new sleeve gasket 316 need not necessarily be moved. Alternatively, or additionally, at least the outer ring 312 may be configured to provide for the movement of the new feed sleeve gasket 316 automatically; for instance, the outer ring 312 may have a sloped recess in which, after the remnant gasket 318 is removed, the new feed sleeve gasket 316 naturally slides, rolls, or otherwise settles into the position previously inhabited by the remnant gasket.

Figure 23:
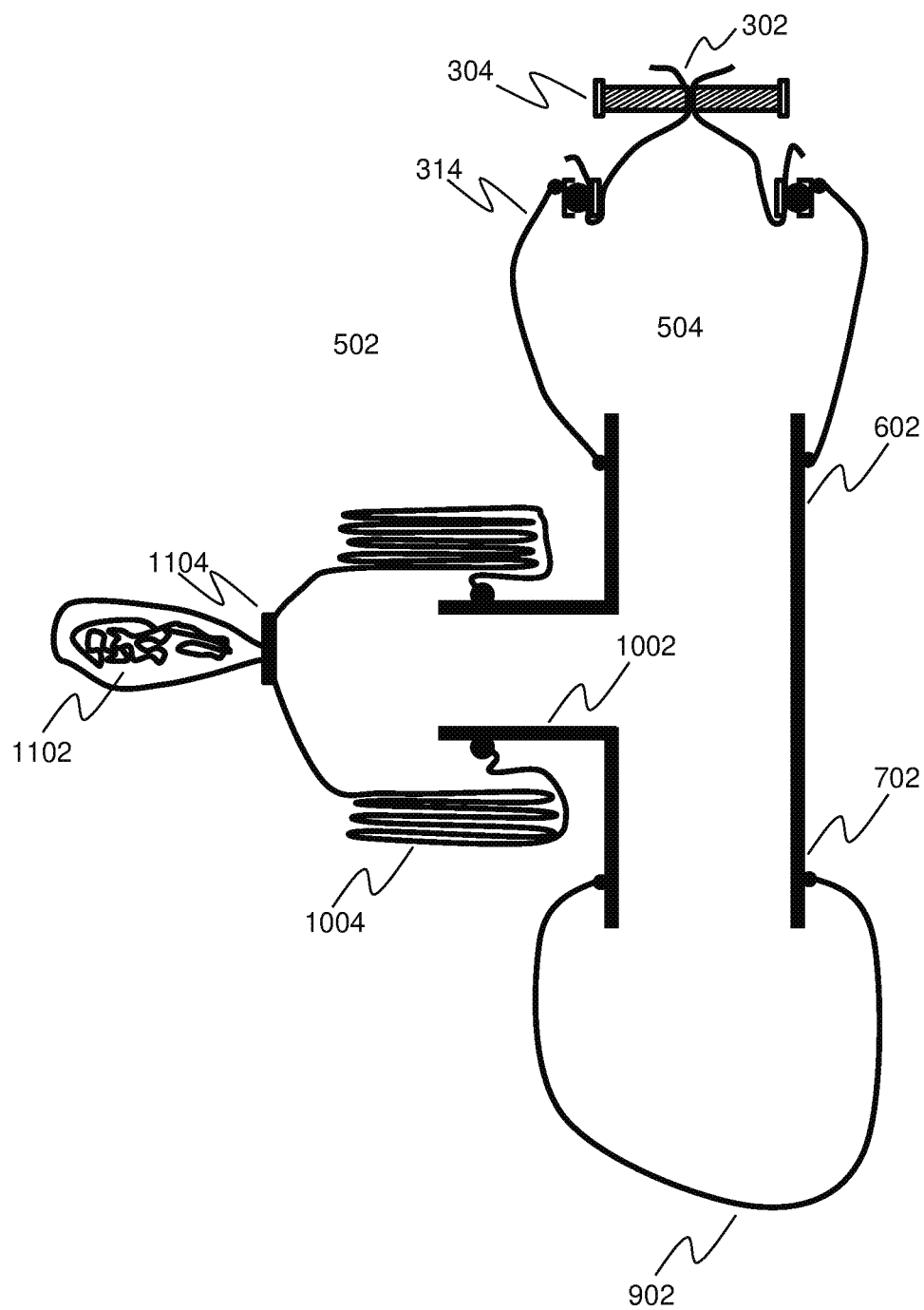
FIG. 23 illustrates a section view of one aspect of a transfer station.
Figure 24:
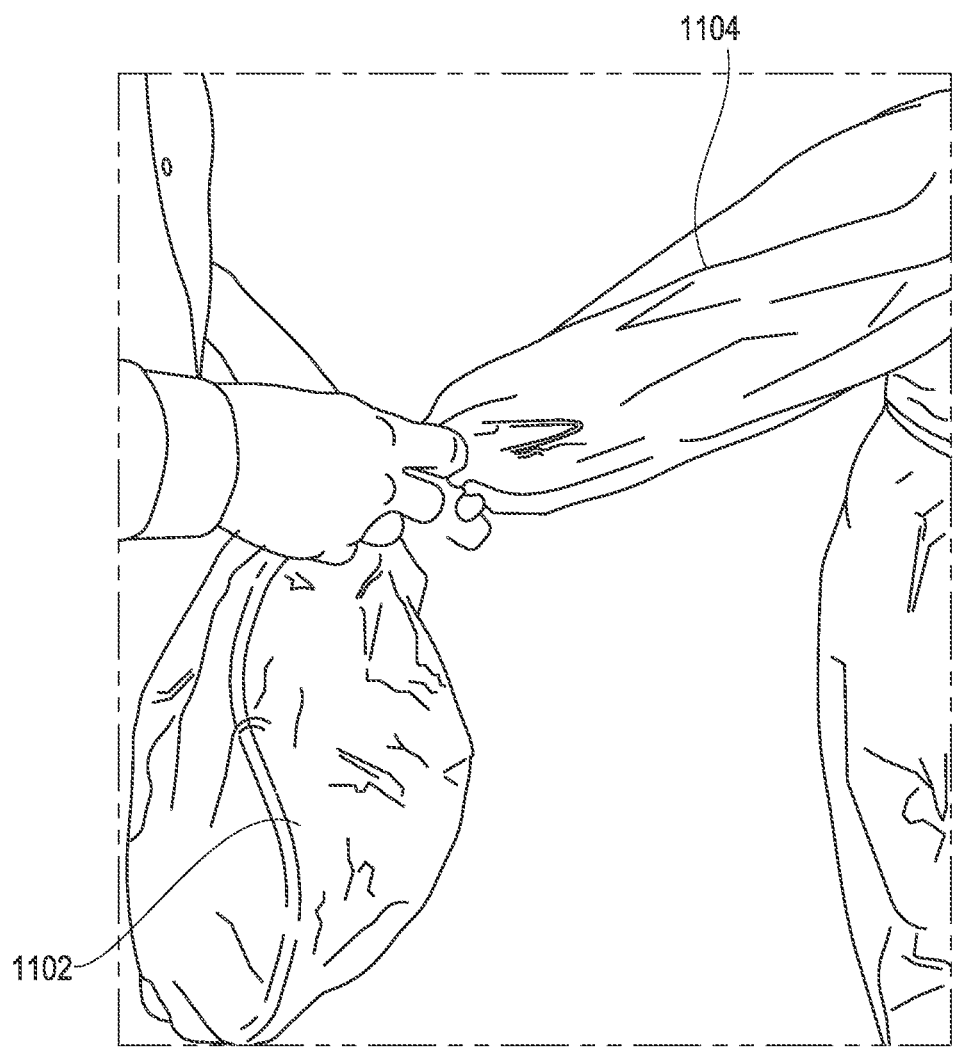
FIG. 24 illustrates one aspect of a transfer station.

After removal of the various articles, such as remnants, from their respective points of capture, the removed articles may be collected in a bag 1102 formed by crimping the flexible containment bag 1004 with a crimp ring 1104, as shown in FIG. 23 and FIG. 24. The crimp ring 1104 may be subdivided and the collected articles may be appropriately disposed. In some aspects, the transfer station may be in readiness to complete another filling cycle after disposal of the remnants.

Figure 25:
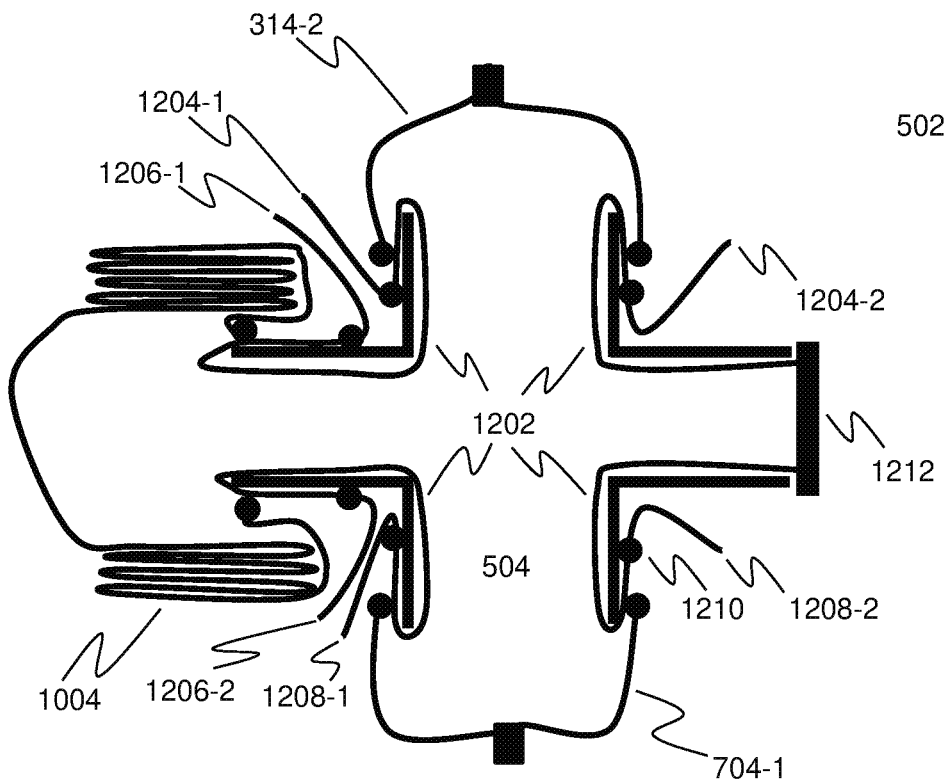
FIG. 25 illustrates a section view of one aspect of a transfer station.
Figure 26:
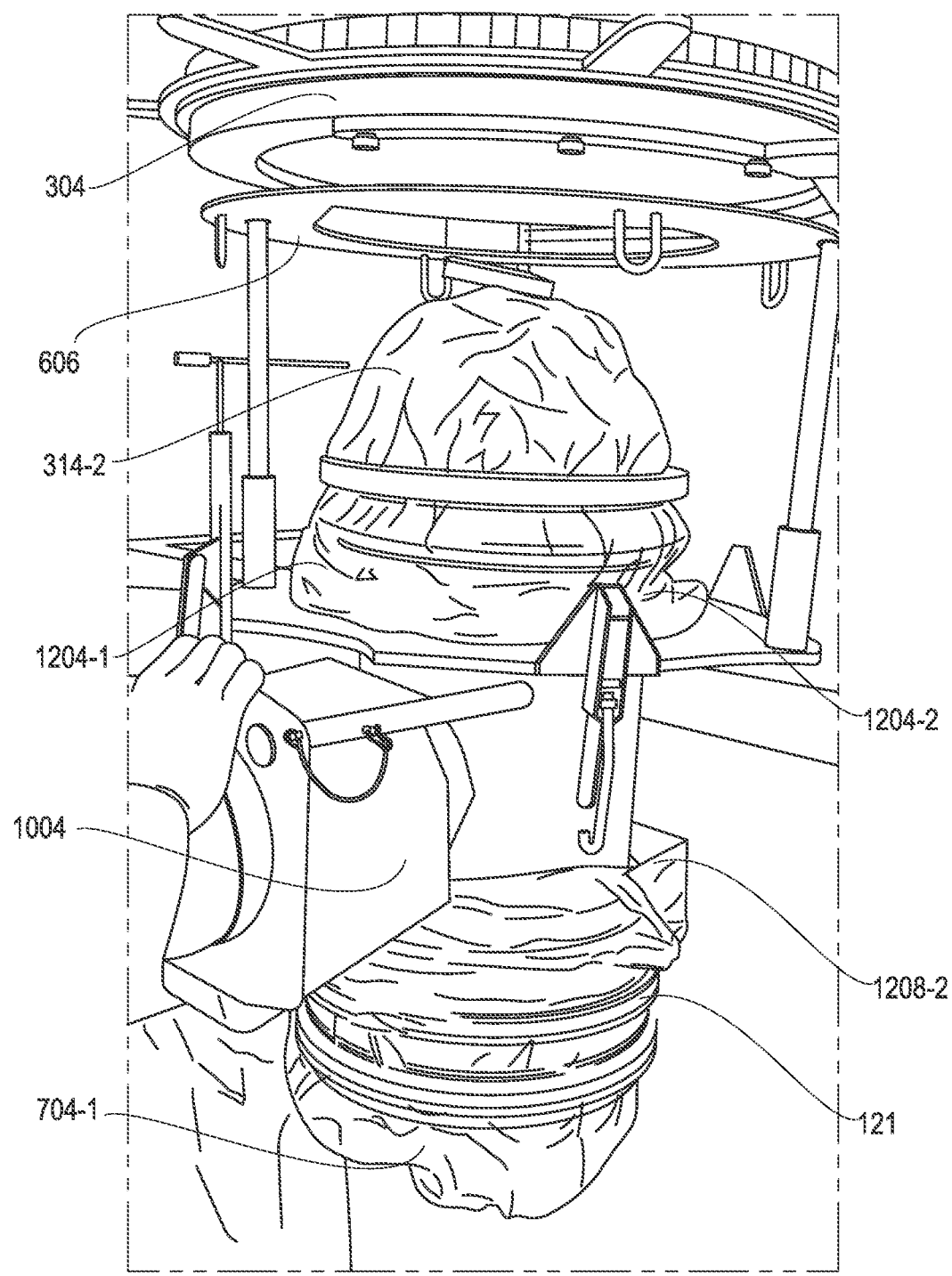
FIG. 26 illustrates one aspect of a transfer station.

In some aspects, the piping assembly may contain a flexible conduit liner 1202, as shown in FIG. 25 and FIG. 26. In some aspects, the flexible conduit liner 1202 may be the only component of the piping assembly which contacts the contaminated atmosphere 504. For example, the flexible conduit liner 1202 may be wrapped around the piping assembly and sealed with gaskets 1210. In some aspects, the filling cycle as described above is not influenced by the presence of the flexible conduit liner 1202.

Figure 27:
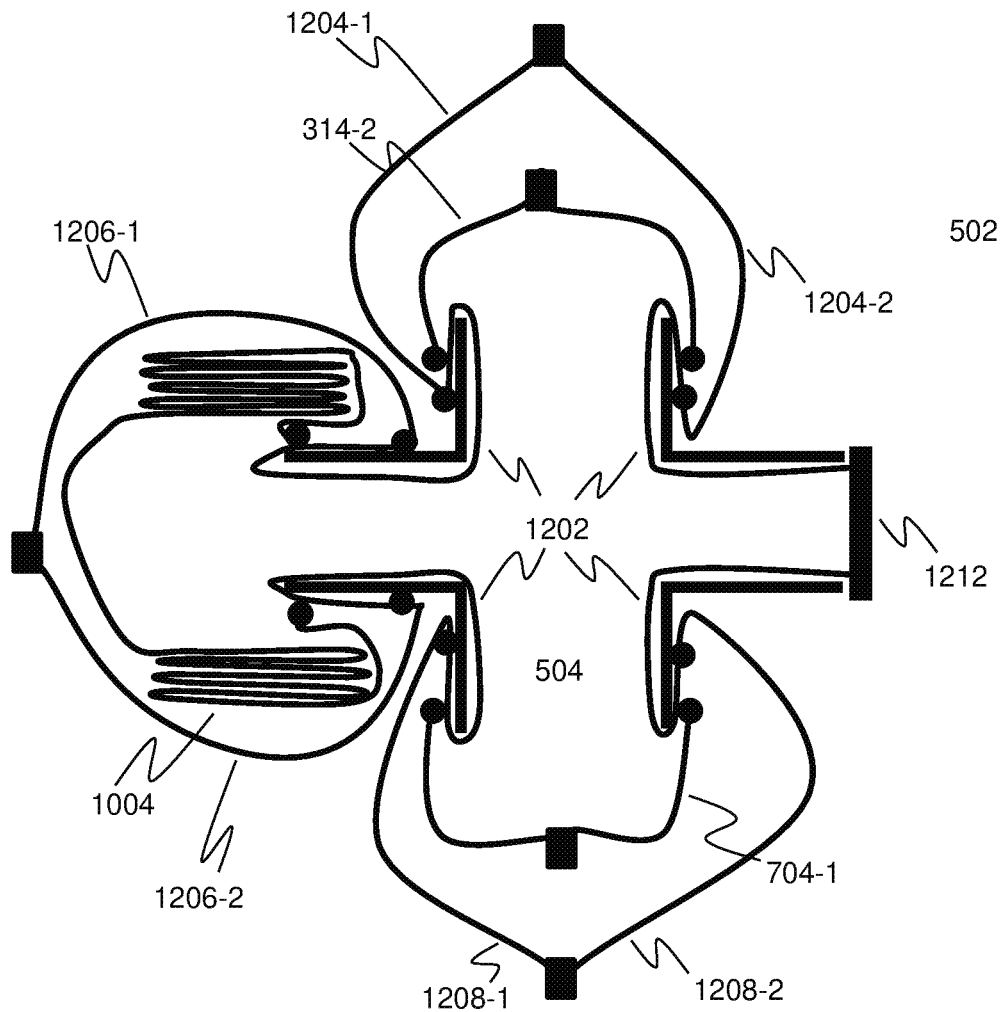
FIG. 27 illustrates a section view of one aspect of a transfer station.
Figure 28:
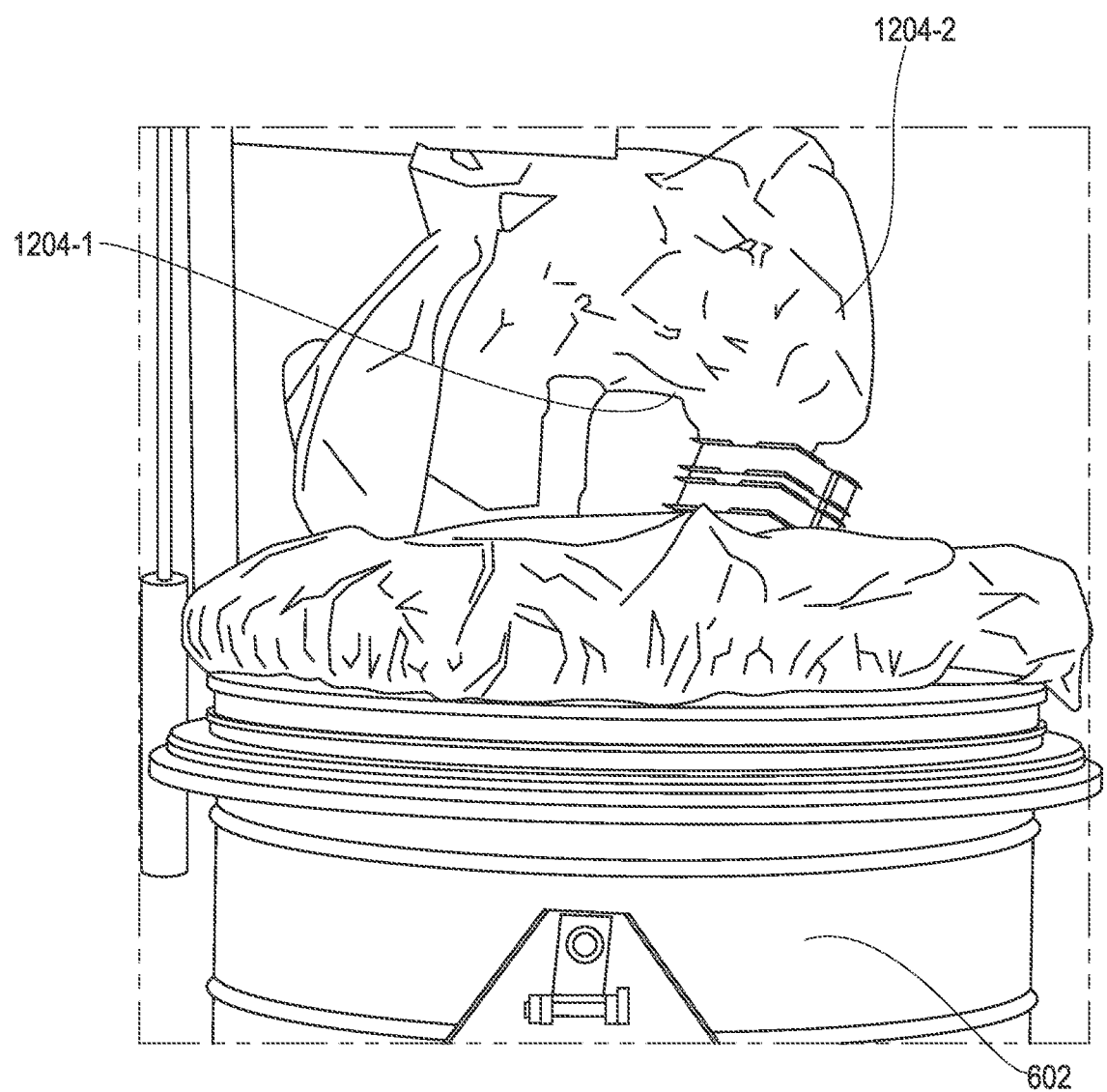
FIG. 28 illustrates one aspect of a transfer station.

However, when the liner needs to be replaced (e.g., for a product changeover), after the lower remnant 314-2 and the upper remnant 704-1 have been formed, the remnants may be captured within the contaminated flexible conduit liner 1202 and removed from the piping assembly without compromising the room atmosphere 502. For example, as shown in FIG. 27 and FIG. 28, inlet ends 1204-1 and 1204-2 at a first end of the flexible conduit liner may be connected and sealed to envelop the lower remnant 314-2, access ends 1206-1 and 1206-2 at an access port of the flexible conduit liner may be connected to envelop the flexible containment bag 1004, and outlet ends 1208-1 and 1208-2 at a second end of the flexible conduit liner may be connected to envelop the upper remnant 704-1. When all ends are connected, the flexible conduit liner 1202 forms within itself a bag containing all contaminated components as well as residual product on the inner surfaces of the flexible conduit liner 1202. At this point, the sealed flexible conduit liner 1202 may be removed from the piping assembly without releasing the contaminated components or the residual product. After removal, the flexible conduit liner may be replaced, along with all other components, such as a new flexible containment bag 1004, a new feed sleeve 314, and a new fill sleeve 704, which may each be captured by the newly lined piping assembly, ready to complete a new filling cycle without risk of cross-contamination.

A filter 1212 may be embedded or attached to the flexible conduit liner 1202 to enable the safe discharge of displaced air and off-gasses from the product. For example, in some aspects, a particulate filter may be employed having a collection efficiency of the most penetrating particle size of at least about 99.995%, such as at least about 99.9995%, such as at least about 99.99995%. In some aspects, a filter meeting HEPA standards may be used. For instance, a HEPA H14, U15, U16, or U17 filter may be used. In another example, a filter rated according to ISO 45 H, 50 H, 55 U, 60 U, 65 U, 70 U, or 75 U may be used. Alternatively or additionally, a filter 1212 could contain a gas separation device to trap or otherwise prevent harmful off-gasses from venting to the atmosphere in the facility. For example, a filter 1212 could be attached via a removable duct to a fume hood. The filter 1212 may be molded directly into the flexible conduit liner 1202. Alternatively or additionally, the filter or a filter housing may be sealed to the flexible conduit liner 1202, such as by thermal or chemical welding. The filter may optionally be positioned to align with an orifice of the piping assembly, such as a filter port as shown in FIG. 27. Alternatively, or additionally, the filter could be remotely located; the filter could be attached to a pipe or a section of liner which extends some distance away from the piping assembly.

Figure 29:
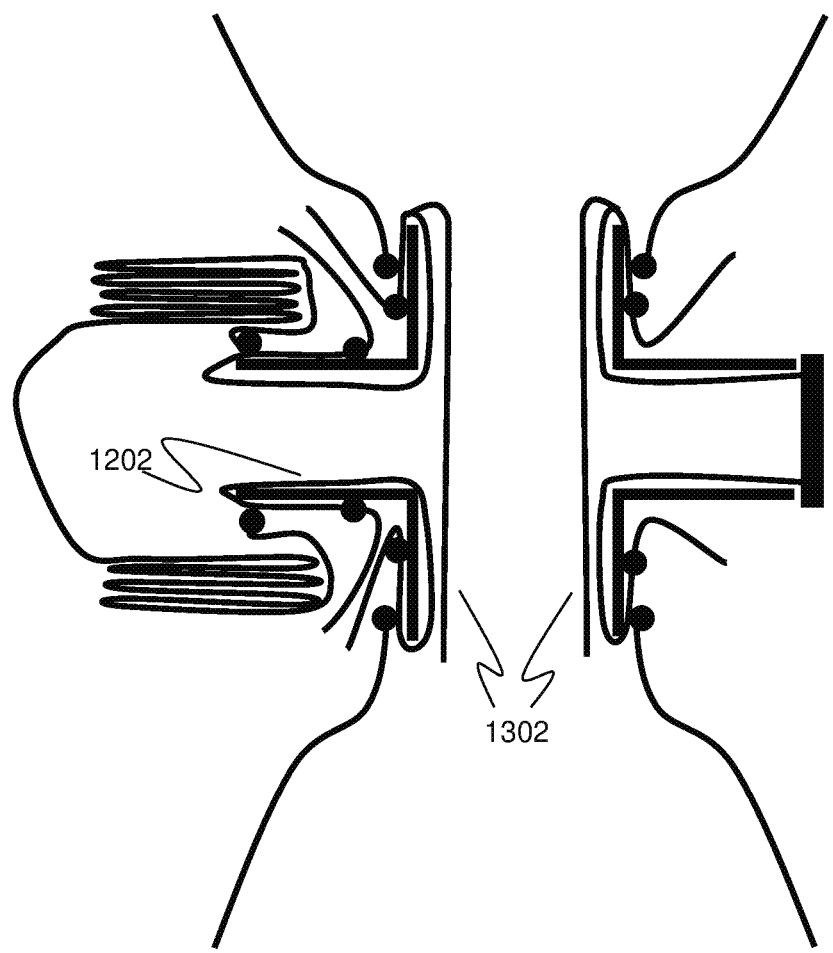
FIG. 29 illustrates a section view of one aspect of a transfer station.

In some examples, the flexible conduit liner 1202 may include flaps 1302 which prevent any powder from accumulating in the access 1002 of the piping assembly or in the filter neck of the piping assembly, as shown in FIG. 29. The flaps 1302 advantageously prevent such accumulation while permitting the lined access 1006 via the liner 1004 as shown in FIG. 21.

Figure 30:
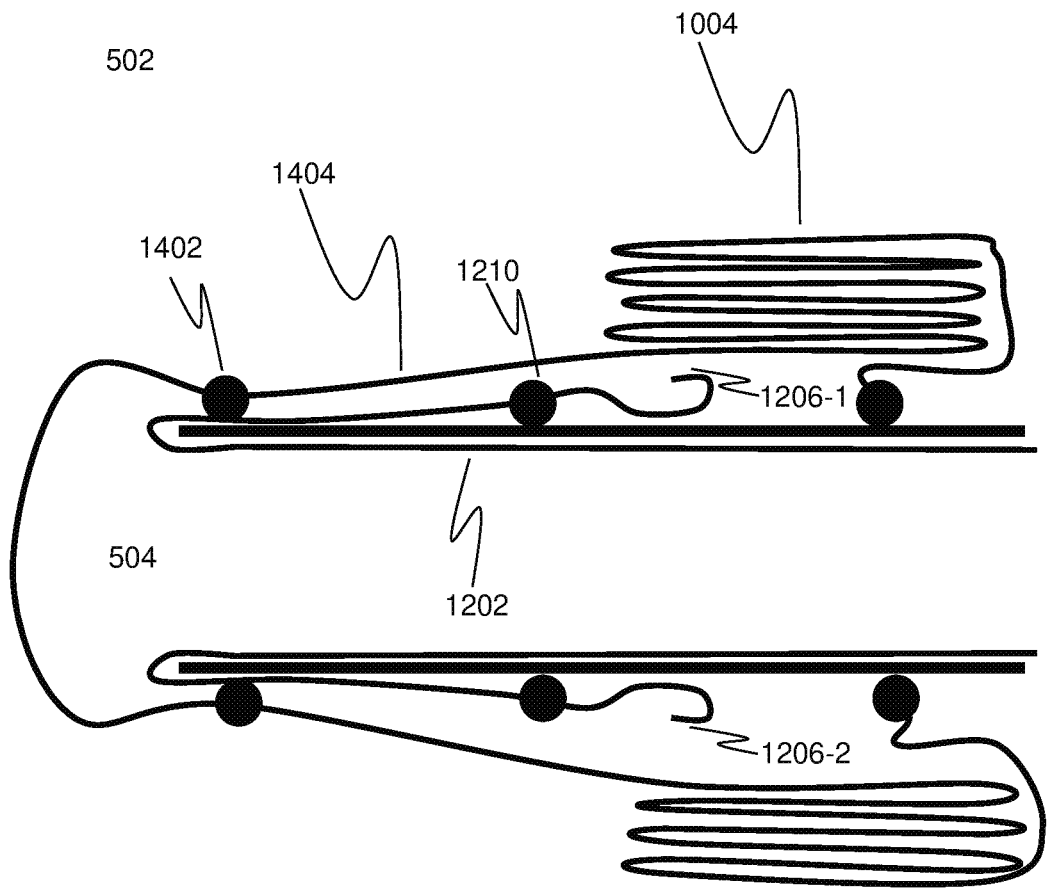
FIG. 30 illustrates a section view of one aspect of a transfer station.

In some aspects, the flexible containment bag 1004 need not be disposed entirely within the flexible conduit liner 1202 when replacing the flexible conduit liner. For example, as shown in FIG. 30, the flexible containment bag 1004 could be situated behind the gasket 1210 of the flexible conduit liner 1202 while being captured against the flexible conduit liner 1202 by an externally applied gasket 1402. In such an aspect, the entirety of the flexible containment bag 1004 is not exposed to the contaminated atmosphere 504: only the portion of the flexible containment bag 1004 within the gasket 1402 is contaminated. Therefore, if the continuous liner is cut, such as at cut point 1404, access ends of the flexible conduit liner, namely 1206-1 and 1206-2, may be connected to envelop only the contaminated portion of the flexible containment bag 1004. After replacement of the flexible conduit liner 1202, the flexible containment bag 1004 may be extended over the flexible conduit liner 1202, sealed at the end (e.g., crimped shut), and captured against the new flexible conduit liner with new gaskets 1402 to again form the configuration shown in FIG. 30, ready for a filling cycle without risk of cross-contamination.

Alternatively, for some aspects, such as those requiring only a single cycle, the flexible conduit liner 1202 may optionally subsume the function of the flexible containment bag 1004. For example, in one aspect, the piping system has no access 1002 and no flexible containment bag 1004, or, alternatively, a modified flexible conduit liner blocks the access 1002 of a piping system having an access 1002. After a single cycle, inlet ends 1204-1 and 1204-2 may be connected to envelop the lower remnant 314-2 and outlet ends 1208-1 and 1208-2 may be connected to envelop the upper remnant 704-1. When all ends are connected, the flexible conduit liner 1202 forms within itself a sealed bag containing all contaminated components. At this point, the sealed liner 1202 may be removed from the piping assembly and replaced.

In general, the transfer station disclosed herein employs single-use liners. "Single-use" is not to be restricted to items removed and/or disposed of after every use cycle. For example, if cycle 1 and cycle 2 bring a first single-use flexible conduit liner 1202 in contact with only a product A, the flexible conduit liner 1202 need not necessarily be replaced between cycles 1 and 2. If, however, cycle 3 introduces a product B, then the flexible conduit liner 1202 would possibly need to be replaced between cycles 2 and 3.

In general, the material of any of the bags, liners, or sleeves of the present disclosure can be any acceptable flexible film. For example, in one aspect, the material may be a monolayer film. Alternately, the material may include a multi-layer film. For example, in one aspect, the film materials used herein can be compound films composed of 2 or more layers bonded with adhesives or via thermal bonding into a film. The multi-layer film includes an interior surface facing the cavity within the sleeve or liner. The multi-layer film further comprises an opposite exterior surface facing the exterior of the sleeve or liner. The layer(s) of the film may be selected to convey any suitable properties. For example, in an aspect wherein the film material includes at least 2 layers, the exterior layer may be selected to confer one property, e.g. mechanical strength, middle layer(s), if present, may be selected to confer additional properties, e.g. gas barrier properties, and the interior layer may be selected, for example, to be suitable for contacting the powdery substance or product. The inner layer may be configured to contact the product within the sleeve or liner while minimizing production effects due to the contact. For example, the inner layer may be treated with an anti-static composition to reduce the amount of product clinging to the sleeves or liners. Additionally or alternatively, the material may be selected with internal or innate anti-cling, anti-static, and/or lubricity properties.

For example, the inner layer may be generally formed of low density polyethylene. In one particular example, the interior surface of the multi-layer film may comprise a low density polyethylene that has been modified to form a hydrophilic surface. Other layers may be added to further modify the properties of the film. For example, in one aspect, acrylamide may be grafted onto LDPE film. As another example, oxidized polyethylene can be used. Additional examples include polyethylene blends with poly(2-hydroxyethyl methacrylate), poly(2,3-dihydroxypropyl methacrylate), and the like. Other polymers, including other polyethylenes, may be suitable for use herein. In certain aspects, any of the film layers described herein may be subjected to irradiation, photo or plasma induction, or oxidation.

In general, the materials of any of the components described herein may be selected to be suitable for the desired application. For example, materials may be selected for strength, weight, chemical stability, flexibility, or otherwise. For example, the piping assembly may be metal or plastic, and rigid or semi-rigid. Although the aspects described herein have introduced a number of discrete components, any variety of components may be combined as an integrated assembly without departing from the scope of the disclosure. For example, any of the gaskets described herein need not be distinct and separate components and may be embedded or integrated into any of the adjoining components.

The process and system of the present disclosure can be used for the handling and transfer of any suitable pharmaceutical or biopharmaceutical products—such as polypeptide products, nucleic acid products (for example DNA or RNA), or cells and/or viruses such as those used in cellular and/or viral therapies.

In aspects, the protein is, e.g., BOTOX, Myobloc, Neurobloc, Dysport (or other serotypes of botulinum neurotoxins), alglucosidase alpha, daptomycin, YH-16, choriogonadotropin alpha, filgrastim, cetrorelix, interleukin-2, aldesleukin, teceleulin, denileukin diftitox, interferon alpha-n3 (injection), interferon alpha-nl, DL-8234, interferon, Suntory (gamma-la), interferon gamma, thymosin alpha 1, tasonermin, DigiFab, ViperaTAb, EchiTAb, CroFab, nesiritide, abatacept, alefacept, Rebif, eptoterminalfa, teriparatide (osteoporosis), calcitonin injectable (bone disease), calcitonin (nasal, osteoporosis), etanercept, hemoglobin glutamer 250 (bovine), drotrecogin alpha, collagenase, carperitide, recombinant human epidermal growth factor (topical gel, wound healing), DWP401, darbepoetin alpha, epoetin omega, epoetin beta, epoetin alpha, desirudin, lepirudin, bivalirudin, nonacog alpha, Mononine, eptacog alpha (activated), recombinant Factor VIII+VWF, Recombinate, recombinant Factor VIII, Factor VIII (recombinant), Alphnmate, octocog alpha, Factor VIII, palifermin, Indikinase, tenecteplase, alteplase, pamiteplase, reteplase, nateplase, monteplase, follitropin alpha, rFSH, hpFSH, micafungin, pegfilgrastim, lenograstim, nartograstim, sermorelin, glucagon, exenatide, pramlintide, iniglucerase, galsulfase, Leucotropin, molgramostim, triptorelin acetate, histrelin (subcutaneous implant, Hydron), deslorelin, histrelin, nafarelin, leuprolide sustained release depot (ATRIGEL), leuprolide implant (DUROS), goserelin, Eutropin, KP-102 program, somatropin, mecaserm in (growth failure), enlfavirtide, Org-33408, insulin glargine, insulin glulisine, insulin (inhaled), insulin lispro, insulin detemir, insulin (buccal, RapidMist), mecaserm in rinfabate, anakinra, celmoleukin, 99 mTc-apcitide injection, myelopid, Betaseron, glatiramer acetate, Gepon, sargramostim, oprelvekin, human leukocyte-derived alpha interferons, Bilive, insulin (recombinant), recombinant human insulin, insulin aspart, mecasenin, Roferon-A, interferon-alpha 2, Alfaferone, interferon alfacon-1, interferon alpha, Avonex' recombinant human luteinizing hormone, dornase alpha, trafermin, ziconotide, taltirelin, diboterminalfa, atosiban, becaplermin, eptifibatide, Zemaira, CTC-111, Shanvac-B, HPV vaccine (quadrivalent), octreotide, lanreotide, ancestirn, agalsidase beta, agalsidase alpha, laronidase, prezatide copper acetate (topical gel), rasburicase, ranibizumab, Actimmune, PEG-Intron, Tricomin, recombinant house dust mite allergy desensitization injection, recombinant human parathyroid hormone (PTH) 1-84 (sc, osteoporosis), epoetin delta, transgenic antithrombin III, Granditropin, Vitrase, recombinant insulin, interferon-alpha (oral lozenge), GEM-21S, vapreotide, idursulfase, omnapatrilat, recombinant serum albumin, certolizumab pegol, glucarpidase, human recombinant C1 esterase inhibitor (angioedema), lanoteplase, recombinant human growth hormone, enfuvirtide (needle-free injection, Biojector 2000), VGV-1, interferon (alpha), lucinactant, aviptadil (inhaled, pulmonary disease), icatibant, ecallantide, omiganan, Aurograb, pexigananacetate, ADI-PEG-20, LDI-200, degarelix, cintredelinbesudotox, Favld, MDX-1379, ISAtx-247, liraglutide, teriparatide (osteoporosis), tifacogin, AA4500, T4N5 liposome lotion, catumaxomab, DWP413, ART-123, Chrysalin, desmoteplase, amediplase, corifollitropinalpha, TH-9507, teduglutide, Diamyd, DWP-412, growth hormone (sustained release injection), recombinant G-CSF, insulin (inhaled, AIR), insulin (inhaled, Technosphere), insulin (inhaled, AERx), RGN-303, DiaPep277, interferon beta (hepatitis C viral infection (HCV)), interferon alpha-n3 (oral), belatacept, transdermal insulin patches, AMG-531, MBP-8298, Xerecept, opebacan, AIDSVAX, GV-1001, LymphoScan, ranpirnase, Lipoxysan, lusupultide, MP52 (beta-tricalciumphosphate carrier, bone regeneration), melanoma vaccine, sipuleucel-T, CTP-37, Insegia, vitespen, human thrombin (frozen, surgical bleeding), thrombin, TransMID, alfimeprase, Puricase, terlipressin (intravenous, hepatorenal syndrome), EUR-1008M, recombinant FGF-I (injectable, vascular disease), BDM-E, rotigaptide, ETC-216, P-113, MBI-594AN, duramycin (inhaled, cystic fibrosis), SCV-07, OPI-45, Endostatin, Angiostatin, ABT-510, Bowman Birk Inhibitor Concentrate, XMP-629, 99 mTc-Hynic-Annexin V, kahalalide F, CTCE-9908, teverelix (extended release), ozarelix, rornidepsin, BAY-504798, interleukin4, PRX-321, Pepscan, iboctadekin, rhlactoferrin, TRU-015, IL-21, ATN-161, cilengitide, Albuferon, Biphasix, IRX-2, omega interferon, PCK-3145, CAP-232, pasireotide, huN901-DMI, ovarian cancer immunotherapeutic vaccine, SB-249553, Oncovax-CL, OncoVax-P, BLP-25, CerVax-16, multi-epitope peptide melanoma vaccine (MART-1, gp100, tyrosinase), nemifitide, rAAT (inhaled), rAAT (dermatological), CGRP (inhaled, asthma), pegsunercept, thymosinbeta4, plitidepsin, GTP-200, ramoplanin, GRASPA, OBI-1, AC-100, salmon calcitonin (oral, eligen), calcitonin (oral, osteoporosis), examorelin, capromorelin, Cardeva, velafermin, 1311-TM-601, KK-220, T-10, ularitide, depelestat, hematide, Chrysalin (topical), rNAPc2, recombinant Factor V111 (PEGylated liposomal), bFGF, PEGylated recombinant staphylokinase variant, V-10153, SonoLysis Prolyse, NeuroVax, CZEN-002, islet cell neogenesis therapy, rGLP-1, BIM-51077, LY-548806, exenatide (controlled release, Medisorb), AVE-0010, GA-GCB, avorelin, ACM-9604, linaclotid eacetate, CETi-1, Hemospan, VAL (injectable), fast-acting insulin (injectable, Viadel), intranasal insulin, insulin (inhaled), insulin (oral, eligen), recombinant methionyl human leptin, pitrakinra subcutancous injection, eczema), pitrakinra (inhaled dry powder, asthma), Multikine, RG-1068, MM-093, NBI-6024, AT-001, PI-0824, Org-39141, Cpn10 (autoimmune diseases/ inflammation), talactoferrin (topical), rEV-131 (ophthalmic), rEV-131 (respiratory disease), oral recombinant human insulin (diabetes), RPI-78M, oprelvekin (oral), CYT-99007 CTLA4-Ig, DTY-001, valategrast, interferon alpha-n3 (topical), IRX-3, RDP-58, Tauferon, bile salt stimulated lipase, Merispase, alaline phosphatase, EP-2104R, Melanotan-II, bremelanotide, ATL-104, recombinant human microplasmin, AX-200, SEMAX, ACV-1, Xen-2174, CJC-1008, dynorphin A, SI-6603, LAB GHRH, AER-002, BGC-728, malaria vaccine (virosomes, PeviPRO), ALTU-135, parvovirus B19 vaccine, influenza vaccine (recombinant neuraminidase), malaria/HBV vaccine, anthrax vaccine, Vacc-5q, Vacc-4x, HIV vaccine (oral), HPV vaccine, Tat Toxoid, YSPSL, CHS-13340, PTH(1-34) liposomal cream (Novasome), Ostabolin-C, PTH analog (topical, psoriasis), MBRI-93.02, MTB72F vaccine (tuberculosis), MVA-Ag85A vaccine (tuberculosis), FARA04, BA-210, recombinant plague FIV vaccine, AG-702, OxSODrol, rBetV1, Der-p1/Der-p2/Der-p7 allergen-targeting vaccine (dust mite allergy), PR1 peptide antigen (leukemia), mutant ras vaccine, HPV-16 E7 lipopeptide vaccine, labyrinthin vaccine (adenocarcinoma), CML vaccine, WT1-peptide vaccine (cancer), IDD-5, CDX-110, Pentrys, Norelin, CytoFab, P-9808, VT-111, icrocaptide, telbermin (dermatological, diabetic foot ulcer), rupintrivir, reticulose, rGRF, HA, alpha-galactosidase A, ACE-011, ALTU-140, CGX-1160, angiotensin therapeutic vaccine, D-4F, ETC-642, APP-018, rhMBL, SCV-07 (oral, tuberculosis), DRF-7295, ABT-828, ErbB2-specific immunotoxin (anticancer), DT3SSIL-3, TST-10088, PRO-1762, Combotox, cholecystokinin-B/gastrin-receptor binding peptides, 111In-hEGF, AE-37, trasnizumab-DM1, Antagonist G, IL-12 (recombinant), PM-02734, IMP-321, rhIGF-BP3, BLX-883, CUV-1647 (topical), L-19 based radioimmunotherapeutics (cancer), Re-188-P-2045, AMG-386, DC/1540/KLH vaccine (cancer), VX-001, AVE-9633, AC-9301, NY-ESO-1 vaccine (peptides), NA17.A2 peptides, melanoma vaccine (pulsed antigen therapeutic), prostate cancer vaccine, CBP-501, recombinant human lactoferrin (dry eye), FX-06, AP-214, WAP-8294A (injectable), ACP-HIP, SUN-11031, peptide YY [3-36] (obesity, intranasal), FGLL, atacicept, BR3-Fc, BN-003, BA-058, human parathyroid hormone 1-34 (nasal, osteoporosis), F-18-CCR1, AT-1100 (celiac disease/diabetes), JPD-003, PTH(7-34) liposomal cream (Novasome), duramycin (ophthalmic, dry eye), CAB-2, CTCE-0214, GlycoPEGylated erythropoietin, EPO-Fc, CNTO-528, AMG-114, JR-013, Factor XIII, aminocandin, PN-951, 716155, SUN-E7001, TH-0318, BAY-73-7977, teverelix (immediate release), EP-51216, hGH (controlled release, Biosphere), OGP-I, sifuvirtide, TV4710, ALG-889, Org-41259, rhCC10, F-991, thymopentin (pulmonary diseases), r(m)CRP, hepatoselective insulin, subalin, L19-IL-2 fusion protein, elafin, NMK-150, ALTU-139, EN-122004, rhTPO, thrombopoietin receptor agonist (thrombocytopenic disorders), AL-108, AL-208, nerve growth factor antagonists (pain), SLV-317, CGX-1007, INNO-105, oral teriparatide (eligen), GEM-OS1, AC-162352, PRX-302, LFn-p24 fusion vaccine (Therapore), EP-1043, *S pneumoniae* pediatric vaccine, malaria vaccine, *Neisseria meningitidis* Group B vaccine, neonatal group B streptococcal vaccine, anthrax vaccine, HCV vaccine (gpE1+gpE2+MF-59), otitis media therapy, HCV vaccine (core antigen+ISCOMATRIX), hPTH(1-34) (transdermal, ViaDerm), 768974, SYN-101, PGN-0052, aviscumnine, BIM-23190, tuberculosis vaccine, multi-epitope tyrosinase peptide, cancer vaccine, enkastim, APC-8024, GI-5005, ACC-001, TTS-CD3, vascular-targeted TNF (solid tumors), desmopressin (buccal controlled-release), onercept, and TP-9201.

In some aspects, the polypeptide is adalimumab (HUMIRA), infliximab (REMICADE™), rituximab (RITUXAN™/MAB THERA™) etanercept (ENBREL™) bevacizumab (AVASTIN™), trastuzumab (HERCEPTIN™), pegrilgrastim (NEULASTA™), or any other suitable polypeptide including biosimilars and biobetters.

Other suitable polypeptides are those listed below and in Table 1 of US2016/0097074:

TABLE I

| Protein Product | Reference Listed Drug |
| --- | --- |
| interferon gamma-1b | Actimmune ® |
| alteplase; tissue plasminogen activator | Activase ®/Cathflo ® |
| Recombinant antihemophilic factor | Advate |
| human albumin | Albutein ® |
| Laronidase | Aldurazyme ® |
| Interferon alfa-N3, human leukocyte derived | Alferon N ® |
| human antihemophilic factor | Alphanate ® |
| virus-filtered human coagulation factor IX | AlphaNine ® SD |
| Alefacept; recombinant, dimeric fusion protein LFA3-Ig | Amevive ® |
| Bivalirudin | Angiomax ® |
| darbepoetin alfa | Aranesp ™ |
| Bevacizumab | Avastin ™ |
| interferon beta-1a; recombinant | Avonex ® |
| coagulation factor IX | BeneFix ™ |
| Interferon beta-1b | Betaseron ® |
| Tositumomab | BEXXAR ® |
| antihemophilic factor | Bioclate ™ |
| human growth hormone | BioTropin ™ |
| botulinum toxin type A | BOTOX ® |
| Alemtuzumab | Campath ® |
| acritumomab; technetium-99 labeled | CEA-Scan ® |
| alglucerase; modified form of beta-glucocerebrosidase | Ceredase ® |
| imiglucerase; recombinant form of beta-glucocerebrosidase | Cerezyme ® |
| crotalidae polyvalent immune Fab, ovine | CroFab ™ |
| digoxin immune fab [ovine] | DigiFab ™ |
| Rasburicase | Elitek ® |
| Etanercept | ENBREL ® |
| epoietin alfa | Epogen ® |
| Cetuximab | Erbitux ™ |
| algasidase beta | Fabrazyme ® |
| Urofollitropin | Fertinex ™ |
| follitropin beta | Follistim ™ |
| Teriparatide | FORTEO ® |
| human somatropin | GenoTropin ® |
| Glucagon | GlucaGen ® |
| follitropin alfa | Gonal-F ® |
| antihemophilic factor | Helixate ® |
| Antihemophilic Factor; Factor XIII | HEMOFIL |
| adefovir dipivoxil | Hepsera ™ |
| Trastuzumab | Herceptin ® |
| Insulin | Humalog ® |
| antihemophilic factor/von Willebrand factor complex-human | Humate-P ® |
| Somatotropin | Humatrope ® |
| Adalimumab | HUMIRA ™ |
| human insulin | Humulin ® |
| recombinant human hyaluronidase | Hylenex ™ |
| interferon alfacon-1 | Infergen ® |
| eptifibatide | Integrilin ™ |
| alpha-interferon | Intron A ® |
| Palifermin | Kepivance |
| Anakinra | Kineret ™ |
| antihemophilic factor | Kogenate ® FS |
| insulin glargine | Lantus ® |

TABLE I-continued

| Protein Product | Reference Listed Drug |
| --- | --- |
| granulocyte macrophage colony-stimulating factor | Leukine ®/Leukine ® Liquid |
| lutropin alfa for injection | Luveris |
| OspA lipoprotein | LYMErix ™ |
| Ranibizumab | LUCENTIS ® |
| gemtuzumab ozogamicin | Mylotarg ™ |
| Galsulfase | Naglazyme ™ |
| Nesiritide | Natrecor ® |
| Pegfilgrastim | Neulasta ™ |
| Oprelvekin | Neumega ® |
| Filgrastim | Neupogen ® |
| Fanolesomab | NeutroSpec ™ (formerly LeuTech ®) |
| somatropin [rDNA] | Norditropin ®/Norditropin Nordiflex ® |
| Mitoxantrone | Novantrone ® |
| insulin; zinc suspension; | Novolin L ® |
| insulin; isophane suspension | Novolin N ® |
| insulin, regular; | Novolin R ® |
| Insulin | Novolin ® |
| coagulation factor VIIa | NovoSeven ® |
| Somatropin | Nutropin ® |
| immunoglobulin intravenous | Octagam ® |
| PEG-L-asparaginase | Oncaspar ® |
| abatacept, fully human soluable fusion protein | Orencia ™ |
| muromomab-CD3 | Orthoclone OKT3 ® |
| high-molecular weight hyaluronan | Orthovisc ® |
| human chorionic gonadotropin | Ovidrel ® |
| live attenuated Bacillus Calmette-Guerin | Pacis ® |
| peginterferon alfa-2a | Pegasys ® |
| pegylated version of interferon alfa-2b | PEG-Intron ™ |
| Abarelix (injectable suspension); gonadotropin-releasing hormone antagonist | Plenaxis ™ |
| epoietin alfa | Procrit ® |
| Aldesleukin | Proleukin, IL-2 ® |
| Somatrem | Protropin ® |
| dornase alfa | Pulmozyme ® |
| Efalizumab; selective, reversible T-cell blocker | RAPTIVA ™ |
| combination of ribavirin and alpha interferon | Rebetron ™ |
| Interferon beta 1a | Rebif ® |
| antihemophilic factor | Recombinate ® rAHF/ |
| antihemophilic factor | ReFacto ® |
| Lepirudin | Refludan ® |
| Infliximab | REMICADE ® |
| Abciximab | ReoPro ™ |
| Reteplase | Retavase ™ |
| Rituxima | Rituxan ™ |
| interferon alfa-2$^{a}$ | Roferon-A ® |
| Somatropin | Saizen ® |
| synthetic porcine secretin | SecreFlo ™ |
| Basiliximab | Simulect ® |
| Eculizumab | SOLIRIS (R) |
| Pegvisomant | SOMAVERT ® |
| Palivizumab; recombinantly produced, humanized mAb | Synagis ™ |
| thyrotropin alfa | Thyrogen ® |
| Tenecteplase | TNKase ™ |
| Natalizumab | TYSABRI ® |
| human immune globulin intravenous 5% and 10% solutions | Venoglobulin-S ® |
| interferon alfa-n1, lymphoblastoid | Wellferon ® |
| drotrecogin alfa | Xigris ™ |
| Omalizumab; recombinant DNA-derived humanized monoclonal antibody targeting immunoglobulin-E | Xolair ® |
| Daclizumab | Zenapax ® |
| ibritumomab tiuxetan | Zevalin ™ |
| Somatotropin | Zorbtive ™ (Serostim ®) |

In aspects, the polypeptide is a hormone, blood clotting/coagulation factor, cytokine/growth factor, antibody molecule, fusion protein, protein vaccine, or peptide as shown in Table 2.

TABLE 2

Exemplary Products

| Therapeutic Product type | Product | Trade Name |
|---|---|---|
| Hormone | Erythropoietin, Epoein-α | Epogen, Procrit |
| | Darbepoetin-α | Aranesp |
| | Growth hormone (GH), somatotropin | Genotropin, Humatrope, Norditropin, NovIVitropin, Nutropin, Omnitrope, Protropin, Siazen, Serostim, Valtropin |
| | Human follicle-stimulating hormone (FSH) | Gonal-F, Follistim |
| | Human chorionic gonadotropin | Ovidrel |
| | Lutropin-α | Luveris |
| | Glucagon | GlcaGen |
| | Growth hormone releasing hormone (GHRH) | Geref |
| | Secretin | ChiRhoStim (human peptide), SecreFlo (porcine peptide) |
| | Thyroid stimulating hormone (TSH), thyrotropin | Thyrogen |
| Blood Clotting/Coagulation Factors | Factor VIIa | NovoSeven |
| | Factor VIII | Bioclate, Helixate, Kogenate, Recombinate, ReFacto |
| | Factor IX | Benefix |
| | Antithrombin III (AT-III) | Thrombate III |
| | Protein C concentrate | Ceprotin |
| Cytokine/Growth factor | Type I alpha-interferon | Infergen |
| | Interferon-αn3 (IFNαn3) | Alferon N |
| | Interferon-β1a (rIFN-β) | Avonex, Rebif |
| | Interferon-β1b (rIFN-β) | Betaseron |
| | Interferon-γ1b (IFNγ) | Actimmune |
| | Aldesleukin (interleukin 2(IL2), epidermal theymocyte activating factor; ETAF | Proleukin |
| | Palifermin (keratinocyte growth factor; KGF) | Kepivance |
| | Becaplemin (platelet-derived growth factor; PDGF) | Regranex |
| | Anakinra (recombinant IL1 antagonist) | Anril, Kineret |
| Antibody molecules | Bevacizumab (VEGFA mAb) | Avastin |
| | Cetuximab (EGFR mAb) | Erbitux |
| | Panitumumab (EGFR mAb) | Vectibix |
| | Alemtuzumab (CD52 mAb) | Campath |
| | Rituximab (CD20 chimeric Ab) | Rituxan |
| | Trastuzumab (HER2/Neu mAb) | Herceptin |
| | Abatacept (CTLA Ab/Fc fusion) | Orencia |
| | Adalimumab (TNFα mAb) | Humira |
| | Etanercept (TNF receptor/Fc fusion) | Enbrel |
| | Infliximab (TNFα chimeric mAb) | Remicade |
| | Alefacept (CD2 fusion protein) | Amevive |
| | Efalizumab (CD11a mAb) | Raptiva |
| | Natalizumab (integrin α4 subunit mAb) | Tysabri |
| | Eculizumab (C5mAb) | Soliris |
| | Muromonab-CD3 | Orthoclone, OKT3 |
| Other: Fusion proteins/Protein vaccines/Peptides | Insulin | Humulin, Novolin |
| | Hepatitis B surface antigen (HBsAg) | Engerix, Recombivax HB |
| | HPV vaccine | Gardasil |
| | OspA | LYMErix |
| | Anti-Rhesus(Rh) immunoglobulin G | Rhophylac |
| | Enfuvirtide | Fuzeon |
| | Spider silk, e.g., fibrion | QMONOS |

In aspects, the protein is multispecific protein, e.g., a bispecific antibody as shown in Table 3.

TABLE 3

Bispecific Formats

| Name (other names, sponsoring organizations) | BsAb format | Targets | Proposed mechanisms of action | Development stages | Diseases (or healthy volunteers) |
|---|---|---|---|---|---|
| Catumaxomab (Removab ®, Fresenius Biotech, Trion Pharma, Neopharm) | BsIgG: Triomab | CD3, EpCAM | Retargeting of T cells to tumor, Fc mediated effector functions | Approved in EU | Malignant ascites in EpCAM positive tumors |
| Ertumaxomab (Neovii Biotech, Fresenius Biotech) | BsIgG: Triomab | CD3, HER2 | Retargeting of T cells to tumor | Phase I/II | Advanced solid tumors |
| Blinatumomab (Blincyto ®, AMG 103, MT 103, MEDI 538, Amgen) | BiTE | CD3, CD19 | Retargeting of T cells to tumor | Approved in USA Phase II and III Phase II Phase I | Precursor B-cell ALL ALL DLBCL NHL |
| REGN1979 (Regeneron) | BsAb | CD3, CD20 | | | |
| Solitomab (AMG 110, MT110, Amgen) | BiTE | CD3, EpCAM | Retargeting of T cells to tumor | Phase I | Solid tumors |
| MEDI 565 (AMG 211, MedImmune, Amgen) | BiTE | CD3, CEA | Retargeting of T cells to tumor | Phase I | Gastrointestinal adenocancinoma |
| RO6958688 (Roche) | BsAb | CD3, CEA | | | |
| BAY2010112 (AMG 212, Bayer; Amgen) | BiTE | CD3, PSMA | Retargeting of T cells to tumor | Phase I | Prostate cancer |
| MGD006 (Macrogenics) | DART | CD3, CD123 | Retargeting of T cells to tumor | Phase I | AML |
| MGD007 (Macrogenics) | DART | CD3, gpA33 | Retargeting of T cells to tumor | Phase I | Colorectal cancer |
| MGD011 (Macrogenics) | DART | CD19, CD3 | | | |
| SCORPION (Emergent Biosolutions, Trubion) | BsAb | CD3, CD19 | Retargeting of T cells to tumor | | |
| AFM11 (Affimed Therapeutics) | TandAb | CD3, CD19 | Retargeting of T cells to tumor | Phase I | NHL and ALL |
| AFM12 (Affimed Therapeutics) | TandAb | CD19, CD16 | Retargeting of NK cells to tumor cells | | |
| AFM13 (Affimed Therapeutics) | TandAb | CD30, CD16A | Retargeting of NK cells to tumor cells | Phase II | Hodgkin's Lymphoma |
| GD2 (Barbara Ann Karmanos Cancer Institute) | T cells preloaded with BsAb | CD3, GD2 | Retargeting of T cells to tumor | Phase I/II | Neuroblastoma and osteosarcoma |
| pGD2 (Barbara Ann Karmanos Cancer Institute) | T cells preloaded with BsAb | CD3, Her2 | Retargeting of T cells to tumor | Phase II | Metastatic breast cancer |
| EGFRBi-armed autologous activated T cells (Roger Williams Medical Center) | T cells preloaded with BsAb | CD3, EGFR | Autologous activated T cells to EGFR-positive tumor | Phase I | Lung and other solid tumors |
| Anti-EGFR-armed activated T-cells (Barbara Ann Karmanos Cancer Institute) | T cells preloaded with BsAb | CD3, EGFR | Autologous activated T cells to EGFR-positive tumor | Phase I | Colon and pancreatic cancers |
| rM28 (University Hospital Tübingen) | Tandem scFv | CD28, MAPG | Retargeting of T cells to tumor | Phase II | Metastatic melanoma |
| IMCgp100 (Immunocore) | ImmTAC | CD3, peptide MHC | Retargeting of T cells to tumor | Phase I/II | Metastatic melanoma |
| DT2219ARL | 2 scFv | CD19, CD22 | Targeting of | Phase I | B cell leukemia |

TABLE 3-continued

Bispecific Formats

| Name (other names, sponsoring organizations) | BsAb format | Targets | Proposed mechanisms of action | Development stages | Diseases (or healthy volunteers) |
|---|---|---|---|---|---|
| (NCI, University of Minnesota) | linked to diphtheria toxin | | protein toxin to tumor | | or lymphoma |
| XmAb5871 (Xencor) | BsAb | CD19, CD32b | | | |
| NI-1701 (NovImmune) | BsAb | CD47, CD19 | | | |
| MM-111 (Merrimack) | BsAb | ErbB2, ErbB3 | | | |
| MM-141 (Merrimack) | BsAb | IGF-1R, ErbB3 | | | |
| NA (Merus) | BsAb | HER2, HER3 | | | |
| NA (Merus) | BsAb | CD3, CLEC12A | | | |
| NA (Merus) | BsAb | EGFR, HER3 | | | |
| NA (Merus) | BsAb | PD1, undisclosed | | | |
| NA (Merus) | BsAb | CD3, undisclosed | | | |
| Duligotuzumab (MEHD7945A, Genentech, Roche) | DAF | EGFR, HER3 | Blockade of 2 receptors, ADCC | Phase I and II Phase II | Head and neck cancer Colorectal cancer |
| LY3164530 (Eli Lily) | Not disclosed | EGFR, MET | Blockade of 2 receptors | Phase I | Advanced or metastatic cancer |
| MM-111 (Merrimack Pharmaceuticals) | HSA body | HER2, HER3 | Blockade of 2 receptors | Phase II Phase I | Gastric and esophageal cancers Breast cancer |
| MM-141, (Merrimack Pharmaceuticals) | IgG-scFv | IGF-1R, HER3 | Blockade of 2 receptors | Phase I | Advanced solid tumors |
| RG7221 (RO5520985, Roche) | CrossMab | Ang2, VEGFA | Blockade of 2 proangiogenics | Phase I | Solid tumors |
| RG7716 (Roche) | CrossMab | Ang2, VEGFA | Blockade of 2 proangiogenics | Phase I | Wet AMD |
| OMP-305B83 (OncoMed) | BsAb | DLL4/VEGF | | | |
| TF2 (Immunomedics) | Dock and lock | CEA, HSG | Pretargeting tumor for PET or radioimaging | Phase II | Colorectal, breast and lung cancers |
| ABT-981 (AbbVie) | DVD-Ig | IL-1α, IL-1β | Blockade of 2 proinflammatory cytokines | Phase II | Osteoarthritis |
| ABT-122 (AbbVie) | DVD-Ig | TNF, IL-17A | Blockade of 2 proinflammatory cytokines | Phase II | Rheumatoid arthritis |
| COVA322 | IgG-fynomer | TNF, IL17A | Blockade of 2 proinflammatory cytokines | Phase I/II | Plaque psoriasis |
| SAR156597 (Sanofi) | Tetravalent bispecific tandem IgG | IL-13, IL-4 | Blockade of 2 proinflammatory cytokines | Phase I | Idiopathic pulmonary fibrosis |
| GSK2434735 (GSK) | Dual-targeting domain | IL-13, IL-4 | Blockade of 2 proinflammatory cytokines | Phase I | (Healthy volunteers) |
| Ozoralizumab (ATN103, Ablynx) | Nanobody | TNF, HSA | Blockade of proinflammatory cytokine, binds to HSA to increase half-life | Phase II | Rheumatoid arthritis |
| ALX-0761 (Merck Serono, Ablynx) | Nanobody | IL-17A/F, HSA | Blockade of 2 proinflammatory cytokines, binds to HSA to increase half-life | Phase I | (Healthy volunteers) |

TABLE 3-continued

Bispecific Formats

| Name (other names, sponsoring organizations) | BsAb format | Targets | Proposed mechanisms of action | Development stages | Diseases (or healthy volunteers) |
|---|---|---|---|---|---|
| ALX-0061 (AbbVie, Ablynx; | Nanobody | IL-6R, HSA | Blockade of proinflammatory cytokine, binds to HSA to increase half-life | Phase I/II | Rheumatoid arthritis |
| ALX-0141 (Ablynx, Eddingpharm) | Nanobody | RANKL, HSA | Blockade of bone resorption, binds to HSA to increase half-life | Phase I | Postmenopausal bone loss |
| RG6013/ACE910 (Chugai, Roche) | ART-Ig | Factor IXa, factor X | Plasma coagulation | Phase II | Hemophilia |

Various aspects of the present disclosure can also be characterized by the following numbered statements:

These and other modifications and variations to the present invention may be practiced by those of ordinary skill in the art, without departing from the spirit and scope of the present invention, which is more particularly set forth in the appended claims. In addition, it should be understood that aspects of the various aspects may be interchanged either in whole or in part. Furthermore, those of ordinary skill in the art will appreciate that the foregoing description is by way of example only, and is not intended to limit the invention so further described in such appended claims.

What is claimed:

1. A method for transferring a biological or pharmaceutical product from a dispensing container to a receiving container comprising:
   flowing a biological or pharmaceutical product from a dispensing container through a sealed conduit to a receiving container, the sealed conduit including a rigid section and a flexible feed sleeve that extends from the dispensing container to the rigid section of the conduit, wherein the biological or pharmaceutical product flows through the flexible feed sleeve into the livid section of the conduit, the rigid section being lined by a flexible conduit liner, the flexible conduit liner including a first end and a second and opposite end, the flexible conduit liner preventing the biological or pharmaceutical product from contacting a surface of the rigid section;
   containing residual biological or pharmaceutical product within the flexible conduit liner after flow of the biological or pharmaceutical product has ceased;
   removing the flexible conduit liner from the conduit without releasing the contained residual biological or pharmaceutical product from within the flexible conduit liner; and
   wherein the method further includes the steps of:
   after flow of the biological or pharmaceutical product has ceased, crimping the used flexible feed sleeve at an intermediate section and separatism the flexible teed sleeve into two parts wherein each part includes a sealed end where the flexible feed sleeve as been crimped;
   inserting a second and unused flexible feed sleeve between the two separate parts of the used flexible teed sleeve and extending the second flexible feed sleeve over each part of the used flexible feed sleeve such that the second flexible feed sleeve extends from the dispensing container to the rigid section of the conduit; and
   removing the separated parts of the used flexible feed sleeve from within the second flexible feed sleeve without permitting release of a residual biological or pharmaceutical product.

2. A method as defined in claim 1, wherein the step of containing residual biological or pharmaceutical product within the flexible conduit liner includes at least one of:
   sealing the first end of the flexible conduit liner;
   sealing the second end of the flexible conduit liner; and
   sealing an access port of the flexible conduit liner.

3. A method as defined in claim 1, wherein the conduit includes an access port, the access port being covered by a flexible containment bag, and wherein the flexible containment bag is inserted into the conduit for enveloping and removing at least one part of the used flexible feed sleeve.

4. A method as defined in claim 3, wherein the flexible containment bag includes a continuous supply of flexible material such that multiple individual bags can be formed from the continuous supply and wherein the flexible containment bag also envelops and removes the flexible conduit liner after flow of the biological or pharmaceutical product has ceased.

5. A method as defined in claim 3, wherein the flexible conduit liner envelops a portion of the flexible containment bag after flow of the biological or pharmaceutical product has ceased.

6. A method as defined in claim 1, wherein the method includes the steps of:
   inserting the flexible containment bag into the conduit for enveloping a part of the used flexible feed sleeve; and
   inverting, crimping and sealing the flexible containment bag with the part of the flexible feed sleeve contained inside.

7. A method for the transfer of a biological or pharmaceutical product comprising:
   feeding a biological or pharmaceutical product from a dispensing container through a sealed conduit;
   constricting the sealed conduit wherein the constriction forms a seal between two portions of the sealed conduit;
   severing the sealed conduit to form two severed portions of the sealed conduit, wherein at least one of the two severed portions forms an internal seal within the sealed conduit;

installing a replacement portion of the sealed conduit over at least one of the constricted severed portions; and removing at least one of the constricted severed portions from within the replacement portion.

8. A method as defined in claim 7, wherein the replacement portion of the sealed conduit is placed over both of the constricted severed portions.

9. A method as defined in claim 7, wherein the sealed conduit comprises a flexible feed sleeve, the flexible feed sleeve being constricted and severed into two portions.

10. A method as defined in claim 9, wherein the sealed conduit further comprises a piping assembly, the flexible feed sleeve being connected to the piping assembly for allowing the flow of the biological or pharmaceutical product therethrough.

11. A method as defined in claim 10, wherein the piping assembly defines an access port, the access port being covered by a flexible containment bag, and wherein the method further includes the step of extending the flexible containment bag into the sealed conduit from the access port for enveloping and removing at least one of the constricted severed portions.

12. A method as defined in claim 9, wherein the piping assembly is lined by a flexible conduit liner that prevents contact between the biological or pharmaceutical product and a surface of the piping assembly, and wherein the liner is removed from the piping assembly after flow of the biological or pharmaceutical product has ceased.

* * * * *